US008317263B2

(12) United States Patent
Telesco

(10) Patent No.: US 8,317,263 B2
(45) Date of Patent: Nov. 27, 2012

(54) VEHICLE SEATING SYSTEM WITH PIVOTING STOP MECHANISM AND METHOD

(75) Inventor: Stephen Patrick Telesco, Dexter, MI (US)

(73) Assignee: CVG Management Corporation, New Albany, OH (US)

( * ) Notice: Subject to any disclaimer, the term of this patent is extended or adjusted under 35 U.S.C. 154(b) by 0 days.

(21) Appl. No.: 13/232,244

(22) Filed: Sep. 14, 2011

(65) Prior Publication Data

US 2012/0062007 A1    Mar. 15, 2012

Related U.S. Application Data

(63) Continuation of application No. 12/235,842, filed on Sep. 23, 2008, now Pat. No. 8,038,210.

(51) Int. Cl.
*B60N 2/42* (2006.01)
*B60N 2/02* (2006.01)
*A47C 1/00* (2006.01)

(52) U.S. Cl. ............ 297/216.19; 297/344.15; 297/344.1

(58) Field of Classification Search .................. 297/325, 297/270.3, 270.2, 270.1, 216.16, 216.2, 216.19, 297/344.15, 344.1, 463.2, 327
See application file for complete search history.

(56) References Cited

U.S. PATENT DOCUMENTS

| | | | | |
|---|---|---|---|---|
| 2,270,172 A * | 1/1942 | Ruegger | .................. | 297/329 |
| 3,998,291 A * | 12/1976 | Davis | ........................ | 180/274 |
| 5,167,421 A * | 12/1992 | Yunzhao | .................. | 297/216.18 |
| 5,280,996 A * | 1/1994 | Trent | ........................ | 297/270.2 |
| 5,366,269 A * | 11/1994 | Beauvais | ................ | 297/216.19 |
| 5,437,494 A * | 8/1995 | Beauvais | ................ | 297/216.19 |
| 5,449,218 A * | 9/1995 | Beauvais et al. | ......... | 297/216.19 |
| 5,605,372 A * | 2/1997 | Al-Abdullateef | ........ | 297/216.16 |
| 5,636,424 A * | 6/1997 | Singer et al. | ............... | 29/407.01 |
| 6,334,648 B1 * | 1/2002 | Girsberger et al. | ...... | 297/216.19 |
| 6,641,214 B2 * | 11/2003 | Veneruso | .................... | 297/322 |
| 7,510,240 B2 * | 3/2009 | Jones et al. | ............. | 297/216.19 |
| 7,918,501 B1 * | 4/2011 | Hanson et al. | ............. | 297/216.2 |

* cited by examiner

*Primary Examiner* — Milton Nelson, Jr.
(74) *Attorney, Agent, or Firm* — Kegler Brown Hill & Ritter; James J. Pingor

(57) ABSTRACT

A vehicle seat system and method in which a seat belt restraint assembly is secured directly to the seat. The vehicle seat system includes a seat frame and a seat base that supports the seat frame. The system includes a first stop operating at rear portions of the seat base and seat frame to couple the seat base and seat frame and to limit forward pivoting movement of the seat frame upon sudden deceleration. The system may also include a second stop to limit rearward pivoting movement of the seat frame. The coupling of the seat base and seat frame provides the seat system with sufficient strength to satisfy load testing requirements and to provide comfort to the occupant. The vehicle system may include a tilt adjustment mechanism that allows tilting of the seat frame and that may also form part of a cushion slide mechanism.

29 Claims, 19 Drawing Sheets

US 8,317,263 B2

VEHICLE SEATING SYSTEM WITH PIVOTING STOP MECHANISM AND METHOD

CROSS-REFERENCE TO RELATED APPLICATIONS

This application is a Continuation of pending U.S. patent application Ser. No. 12/235,842 filed on Sep. 23, 2008 and entitled "VEHICLE SEATING SYSTEM WITH PIVOTING STOP MECHANISM AND METHOD." The entirety of the above-noted application is incorporated herein by reference.

FIELD OF THE INVENTION

This invention relates to a vehicle seating system and method, and more particularly, to a vehicle seating system and method involving structural features to accommodate a seat belt restraint system carried by the seat frame.

BACKGROUND OF THE INVENTION

The conventional seat belt restraint system includes a shoulder portion and a lap portion. One end of the shoulder portion is commonly attached to the frame of the vehicle at a location adjacent the occupant's shoulder. By attaching the shoulder belt to the vehicle body, the vehicle body, rather than the vehicle seat, absorbs a relatively significant portion of the loads to which the occupant is exposed during a sudden deceleration of the vehicle.

In the United States, seats and seat belt assemblies must comply with the Federal Motor Vehicle Safety Standards (FMVSS). These standards have been developed to help minimize the possibility of the failure of seat and restraint designs by the forces acting on them as a result of a sudden deceleration or vehicle impact. For example, FMVSS 571.207 and 571.210 (37 C.F.R. §§571.207 & 571.210 (2008)) currently require a seat and seat belt assembly for many vehicles to withstand forces in excess of 3,000 pounds applied to the shoulder belt and lap belt portions of the seat belt.

Other countries impose their own regulations. More specifically, European countries also have safety requirements for seat and restraint designs in the event of a crash or sudden deceleration. For example, certain regulations permit only a limited amount of deformation of the D-ring of a seat belt assembly under load testing.

More recently, design efforts have been focused on attaching the upper end of the shoulder belt to the frame of the seat, instead of to the frame of the vehicle. In other words, it has become desirable to design a seat belt assembly that is integrated with the seat. An integrated seat belt assembly is generally more comfortable to the occupant and facilitates the installation of the seat and the accompanying belts within a vehicle. The shoulder belt tends to chafe the neck of the occupant less than do shoulder belts that are attached to the frame of the vehicle, due to such factors as the height of the occupant, the unevenness of the road, or whether the individual desires to recline in the seat. These considerations make wearing of a seat belt attached to the vehicle body uncomfortable.

Where the seat belt is integrated with the seat frame, however, the seat frame must include structural mechanisms to protect an occupant in the event of a collision or sudden deceleration. In this circumstance, the seat frame will experience significant forces exerted by the combination of the occupant and seat belt that would otherwise be experienced by the vehicle frame. Accordingly, in order to improve safety, and in order to comply with governmental standards and loading tests, the frame of the seat must have a much stronger design when the shoulder belt is attached to the seat frame than when it is attached to the vehicle body. Previous efforts to render the seat frame stronger have resulted in designs that are too bulky, heavy, or costly to be practical from a manufacturing standpoint. Further, previous efforts have focused on making the seat itself stronger, rather than the seat base assembly that supports the seat.

It is also desirable to include a tilt mechanism that allows the seat frame to be adjusted to a desired angle of inclination of the occupant. This tilt mechanism must allow adjustment through a predetermined angular range of rotation but must be prevented from further pivoting rotation by a stop. The tilt mechanism and the stop must be coordinated to allow the occupant to adjust the seat frame through a predetermined range without interference from the stop but to prevent further tilting motion once a predetermined limit is reached.

Thus, there is a need for a lightweight vehicle seating system, including seat base assembly, which allows a seat belt restraint assembly to be integrated with the vehicle seating system. Further, there is a need for a vehicle seat and integrated seat belt system that prevents the seat from failing in the event of a collision or sudden deceleration and that complies with national safety requirements. In addition, there is a need for a tilt mechanism that cooperates with the pivot stop to allow a predetermined range of angular rotation of the seat frame without interference but that limits further movement beyond a predetermined position. The tilt mechanism should have a relatively simple design, relatively low cost, and improved reliability.

DETAILED DESCRIPTION OF THE PREFERRED EMBODIMENTS

Figure 1:
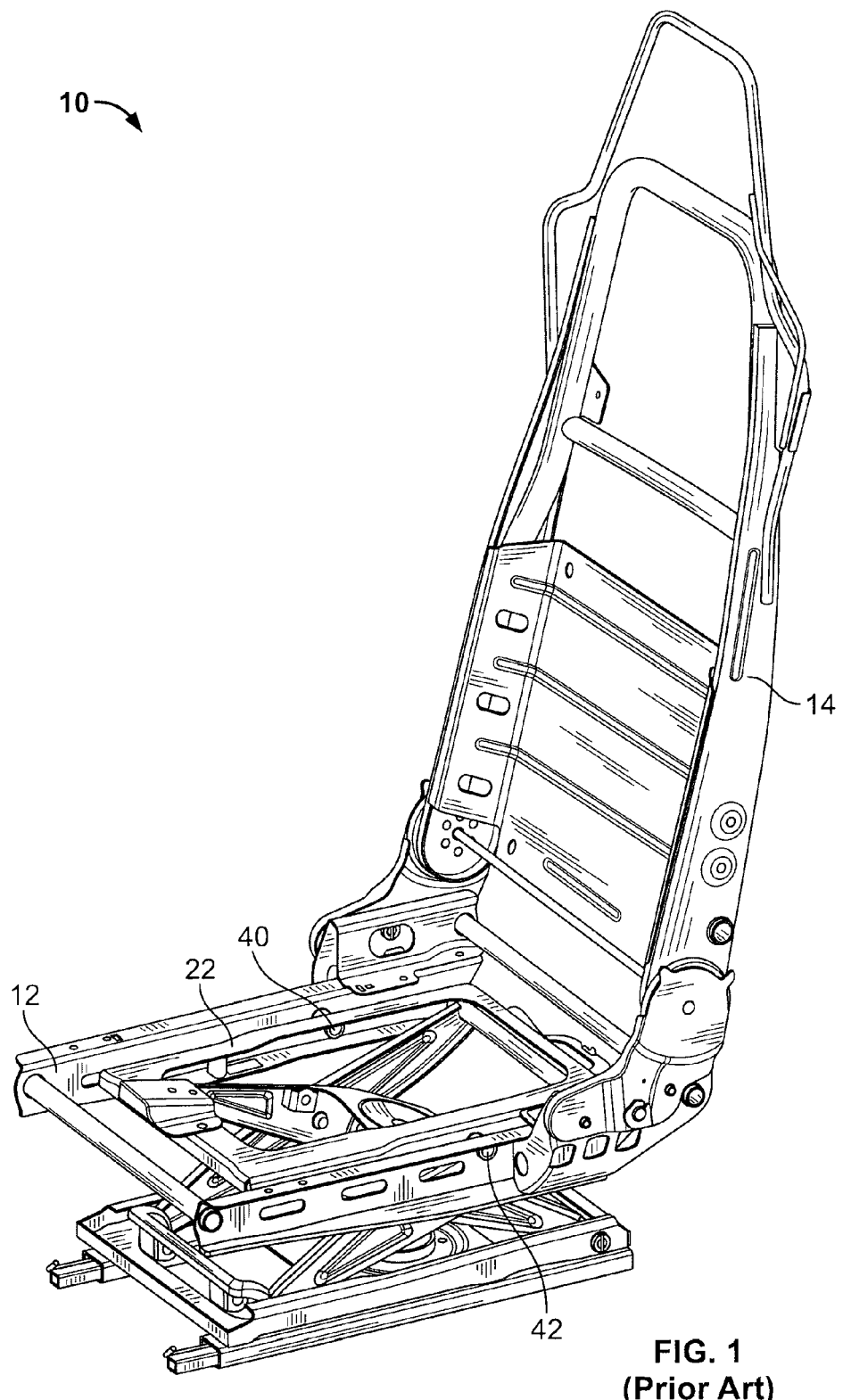
FIG. 1 is a perspective view of a vehicle seat, according to a known prior art configuration.
Figure 2:
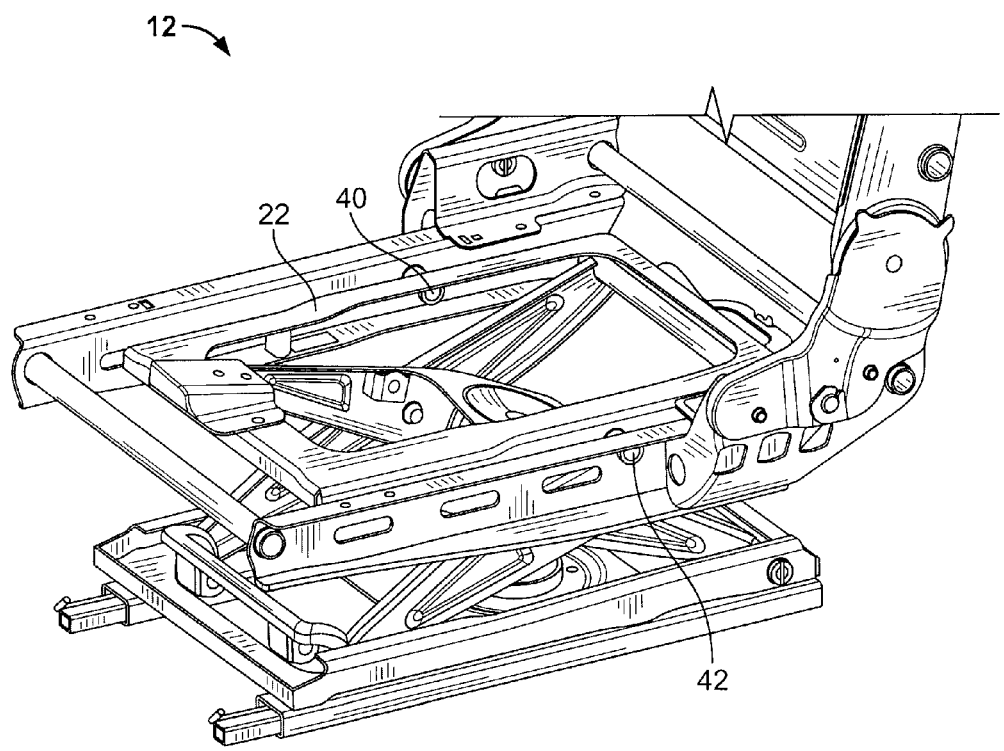
FIG. 2 is an enlarged perspective view of the seat base of the vehicle seat of FIG. 1.

FIG. 1 shows a conventional suspension base seat 10, which is known in the art. The seat 10 generally includes a seat base 12 (FIG. 2) and a seat frame 14. Generally, padding and upholstery are secured to the seat 10 for the comfort of an occupant but are removed in FIGS. 1 and 2 to better illustrate the support structure of the seat 10. The suspension base seat 10 further includes an integrated seat belt restraint assembly (not shown) that may be secured directly to the seat 10 and not to the interior structure of the vehicle.

Figure 3:
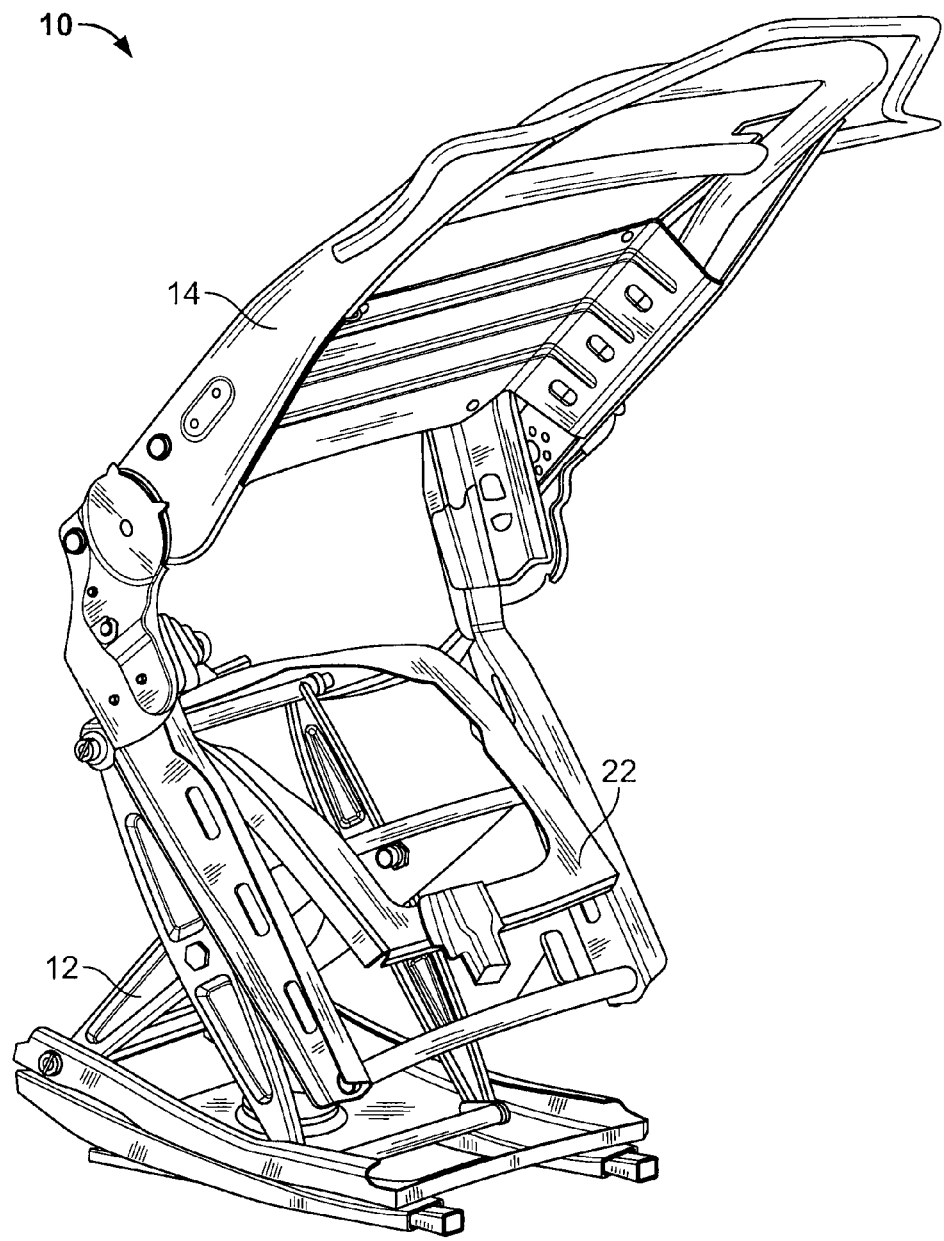
FIG. 3 is a perspective view of the vehicle seat of FIG. 1 after application of a simulated frontal crash load.

FIG. 3 shows the seat 10 following application of a frontal crash load. As can be seen, application of the load has caused deformation of the structural supports and has resulted in significant pivoting movement of the seat frame 14. Under crash conditions, this pivoting can result in serious bodily injury to the seat occupant. As described further below, the preferred embodiments described herein are directed to a pivoting stop mechanism (that allows the use of a seat belt restraint assembly integrated with the seat 10) for providing additional support to limit pivoting motion of a seat in the event of a vehicle crash or sudden deceleration. The pivoting stop mechanism generally provides an additional structural linkage between the seat base and the seat frame to limit pivoting of the seat frame beyond a predetermined range of motion.

Figure 4:
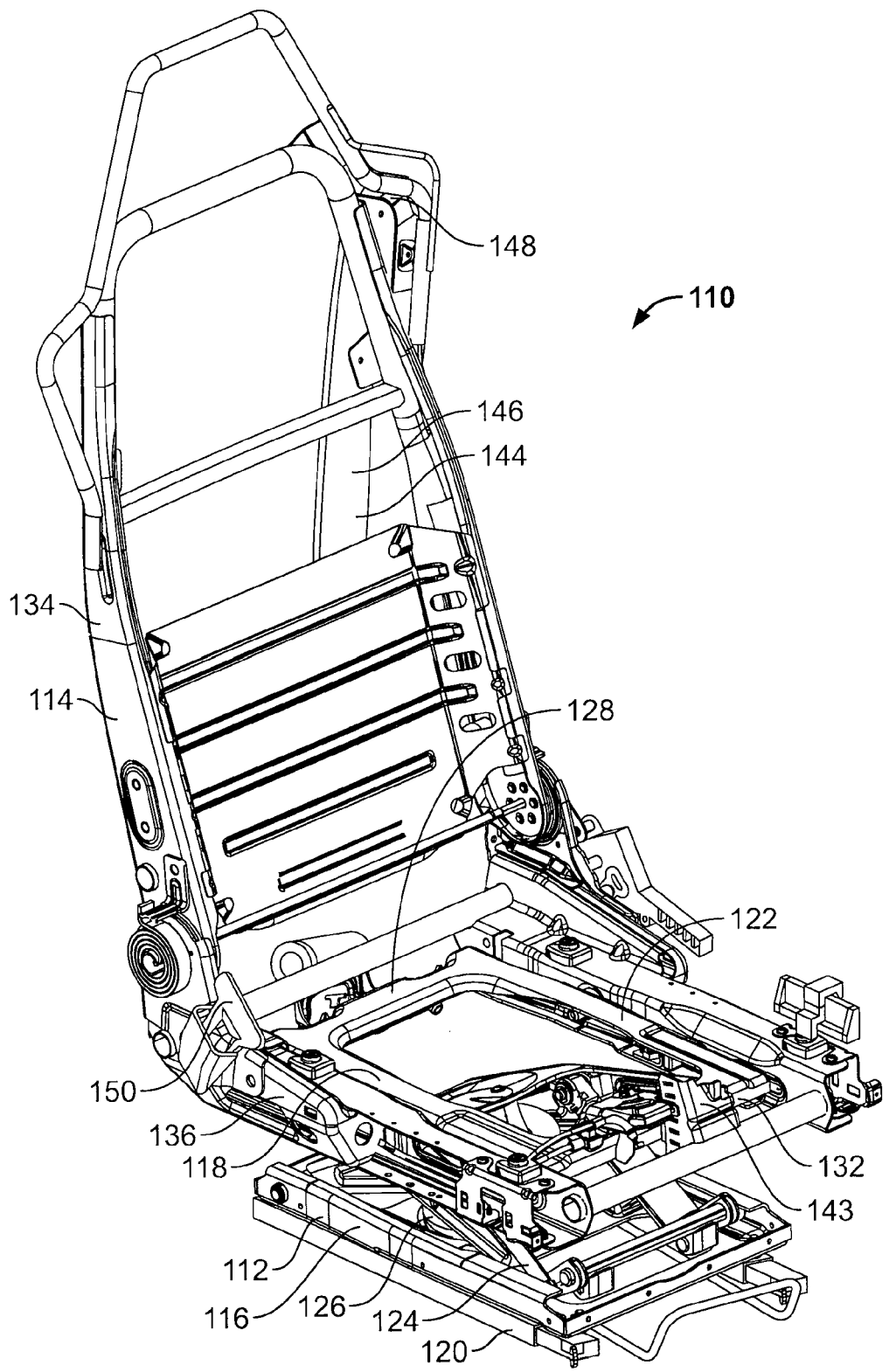
FIG. 4 is a perspective view of a first embodiment of a vehicle seat embodying features of the present invention.

FIG. 4 shows a first preferred embodiment of a seat 110, which is generally a suspension seat having a seat base 112 and seat frame 114. The seat base 112 includes a bottom mounting portion 116 and an upper support portion 118. The seat 110 is secured to the interior floor of a vehicle at the bottom mounting portion 116. As shown in FIG. 4, the bottom portion 116 is preferably mounted slidably on rails 120 to allow fore-aft adjustment of the seat 110. The seat base 112 further includes a platform 122 at the upper portion 118 that is connected to the bottom portion 116 by a suspension linkage 124, preferably by a cross-bar or scissors linkage. The seat base 112 is also preferably height adjustable in a vertical direction to accommodate the preferences of an occupant. The height of the platform 122 is adjustable by controlling the distance between the ends of the bars that make up the scissor linkage 124. The seat may also include an air spring 126 secured between the lower and upper portions 116 and 118 of the seat base 112. It may further include dampers or other conventional dampening and suspension devices.

The scissor linkage 124 comprises two pairs of bars for each scissor. The bars of each pair are preferably connected to each other by pivot pins 126 at the center of each bar, allowing for pivotal movement of the scissors. Opposing pairs are connected to one another at the rear end 128 of the platform 122 by a suspension rod 130. The scissors are preferably pinned at their lower ends to the mounting portion 116 of the seat base 112 and at their front upper ends to the front end 132 of the platform 122. The platform 122 and suspension rod 130 are preferably part of a seat height adjustment mechanism.

The seat 110 also includes a seat frame 114 for support of an occupant. The seat frame 114 preferably includes an upper backrest frame portion 134 and a lower seat frame portion 136. As shown in FIG. 4, the upper frame 134 provides support for the mid and upper body of a seat occupant. The upper frame 134 may include an adjustment mechanism 138 to adjust the angle of inclination of the upper frame 134 with respect to the lower frame 136.

The lower seat frame 136 is connected to and supported by the platform 122 via pivot pins 140 and 142. Pivot pins 140 and 142 permit the lower frame 136 to tilt on an axis of rotation, controlled by tilt mechanism 143, for the comfort of the occupant. In turn, the upper frame 134 is attached to the lower frame 136 via mounting brackets 138. The upper frame 134 is also permitted to selectively adjust its angle with respect to the lower frame 136 by pivoting at the brackets 138 around axis of rotation. A restraining belt 144 is anchored to the vehicle in a position that, when engaged, acts to restrain the occupant of the seat in position under a sudden crash load. Although a preferred form of the upper backrest frame portion 134 is shown in FIG. 4, it should be evident that other conventional backrest frames may also be used with the preferred embodiments of the vehicle seat with pivoting stop mechanism, described below.

As can be seen in FIG. 4, the seat 110 preferably includes a seat belt restraint assembly 146. The assembly 146 includes a restraining belt 144, which is secured to the seat 110 at lower frame 136 and upper frame 134. More specifically, the seat 110 includes a D-ring member 148 mounted to the upper frame 134 and a buckle 150 is mounted to the lower frame 136. The belt 144 passes through the D-ring member 148 and is fastened to the buckle 150 anchored to the lower frame 136.

In other words, the restraining belt 144 is integrated with the seat 110, not attached to the interior structure of the vehicle. An integrated restraining 144 belt is typically more comfortable than a restraining belt attached to the vehicle. Further, anchoring the restraining belt 144 to the seat 110 itself is advantageous because it makes installation of the seat 110 easier, i.e., the seat becomes a complete unit applicable for installation in nearly any vehicle of adequate size. Although one form of seat belt restraint assembly 146 is shown herein, the preferred embodiments of the vehicle seat with pivoting stop mechanism, as described further below, are not dependent on any particular form of seat belt restraint assembly and others may be used.

As noted above, FIG. 3 illustrates a simulation of how the seat 10 reacts when a predetermined crash load is applied to the restraining belt. When the crash load is applied to the restraining belt, the force is transferred to the body of the seat, causing pivoting forward rotation of the seat frame 14 and deformation of the seat frame 14. The tilt mechanism support structures, including without limitation pivot pins 16 and 18 and tilt controller 20, are not of sufficient strength to prevent deformation when such high loads are applied.

Such pivoting forward rotation of the seat frame 14 may result in serious injury under crash circumstances. The degree of deformation illustrated in FIG. 3 is therefore considered undesirable, and, under certain governmental regulations, is deemed unacceptable. The forward deflection of the seat frame 14 in both linear and angular terms is deemed unsafe and likely violates governmental safety regulations. As can be seen in FIG. 3, the deformation is attributable, in part, to the separation between the platform 22 and the seat frame 14 induced at their respective rear ends by the force of the crash load.

Accordingly, as described below, the preferred embodiments described herein include a safety structure, i.e., a pivoting stop mechanism, to limit forward pivoting rotation of a vehicle seat. More specifically, the pivoting stop mechanism 152 couples the seat frame 114 to the seat base 112 to prevent undesirable pivoting of the seat frame under crash conditions. Thus, the pivoting stop mechanism 152 permits the use of an integrated restraining belt 144 such that the seat 110 and belt 144 maintain their structural integrity under crash loads. The pivoting stop mechanism 152, however, still permits a range of pivoting motion of the seat frame 114 in order to allow the seating position to be tiltably adjusted for occupant comfort under normal conditions. It should be evident that the exact form of many of the seat features, shown in FIG. 4, are not necessary for operation of the pivoting stop mechanism 152, described below, and therefore, other forms of such features may be used, such as, for example, other types of seat bases, seat frames, suspension linkages, etc.

Figure 5:
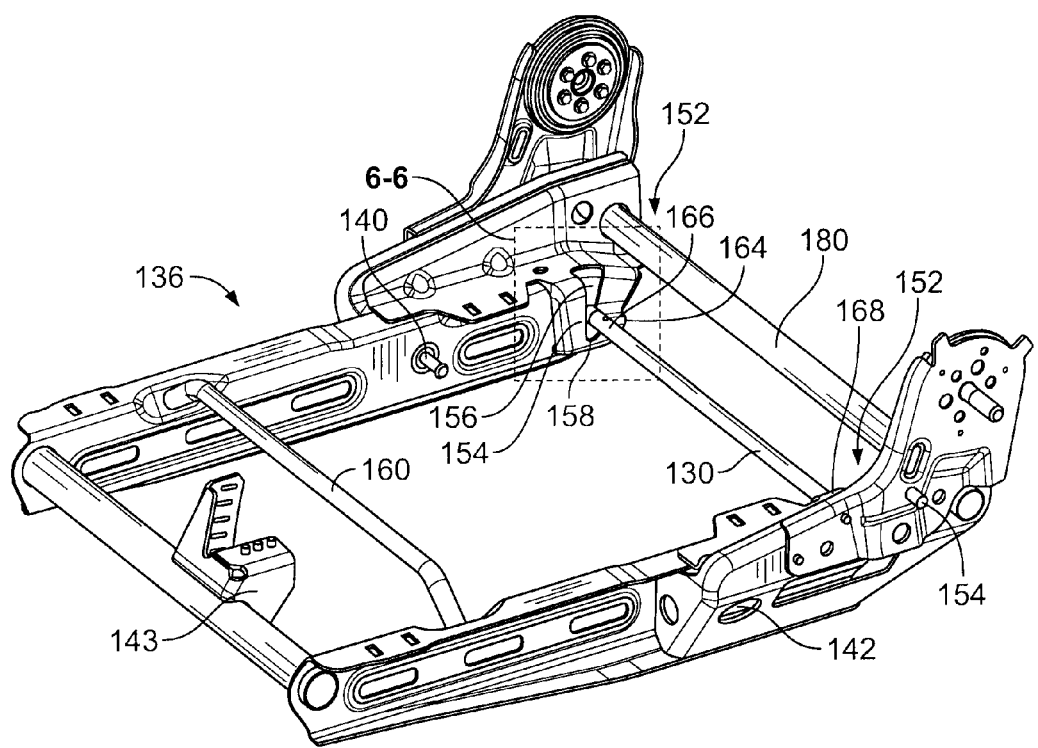
FIG. 5 is a perspective view of the lower seat frame of the vehicle seat of FIG. 4.

As can be seen from FIG. 5, the lower seat frame 136 includes two stop brackets 154, which are essentially mirror-image versions of one another, with each mounted on either side at the rear of the lower frame 136. The term "bracket" is generally used in a broad sense to refer to a rigid structural member of any desired shape. Each stop bracket 154 includes a slot 156 which interfaces with a suspension rod 130 permitting ordinary and planned tilting movement of the lower frame 136 relative to the platform 122. Slot 156 of the stop bracket 154 limits the travel between the lower frame 136 and the platform 122, particularly under crash loads, and thereby gives increased structural stability to the seat 110.

In other words, the pivoting stop mechanism 152 preferably includes two stop brackets 154, each having a slot 156 therein, and a suspension rod 130 that extends between the brackets 154 and is inserted into the slot 156 of each. Each stop bracket 154 is preferably mounted to the lower seat frame 136 (or an integral portion thereof) and preferably interconnects the upper and lower frames 134 and 136. The stop bracket 154 has a slot 156 therein which permits a range of motion for the seat frame 114 as it is adjustably tilted by the user under normal conditions. Under crash conditions, the suspension rod 130 engages a closed end 158 of each slot 156 to prevent pivotal rotation of the seat frame 114 beyond a predetermined maximum angle of inclination.

The pivoting stop mechanism 152 may also optionally include a forward bar 160 that extends from one side of the lower seat frame 136 to the other. The forward bar 160 assists the stop brackets 154 in preventing forward pivoting movement of the seat frame 136 under crash conditions. Under these circumstances, the underside of the forward bar 160 engages the top of the platform 122 to prevent downward angular movement of the seat frame 136. In contrast to the stop brackets 154 and suspension rod 130 (which operate at the rear of the lower frame 136), the forward bar 160 operates at a different location, i.e., at the front of the lower frame 136.

Figure 6:
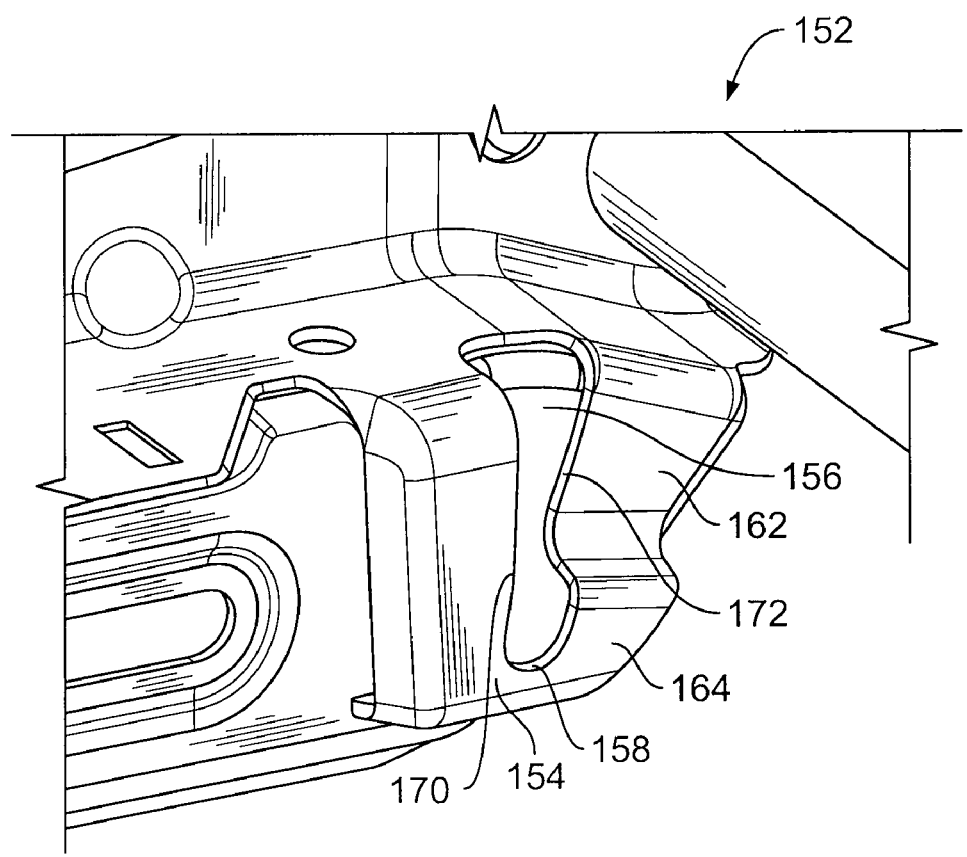
FIG. 6 is an enlarged perspective view of the area 6-6 of FIG. 5.

FIG. 6, which shows the area 6-6 of FIG. 5, illustrates a right-side stop bracket 154. The suspension rod 130 is removed from FIG. 6 to better illustrate the features of the stop bracket 154. As can be seen, the slot 156 is sized to accommodate the free end of the suspension rod 130. Slot 156 is shaped to permit a predetermined range of relative movement between the lower frame 136 and the platform 122. Slot 156 has at least one closed end 158, which serves as a stop to limit the relative motion between the lower frame 136 and the suspension rod 130.

Other preferable features of the stop bracket 154 are shown in FIG. 6. Among these, the stop bracket 154 preferably includes a depression jog 162. When the seat 110 is assembled, the suspension rod 130 is longer than the distance between the inner walls 164 of the brackets 154 on the assembled seat 110. Therefore, as an aid to assembly, either or both stop brackets 154 preferably include a depression jog 162 that allows the suspension rod 130 to be mounted in the respective slots 156. The slot 156 preferably includes an open end 164 opposite the closed end 158. Open end 164 is open in the sense that the slot is preferably U-shaped. Alternatively, the opposing side walls of the slot 156 may be farther apart at an open end 164 then elsewhere along the length of the slot 156, thus defining more of a V-shaped open end 164. In other words, the slot 156 may be any of various shapes to allow a range of movement for the stop bracket 154 under normal circumstances and having at least one closed end 158 to prevent further upward movement of the stop bracket 154 under crash circumstances.

Figure 7:
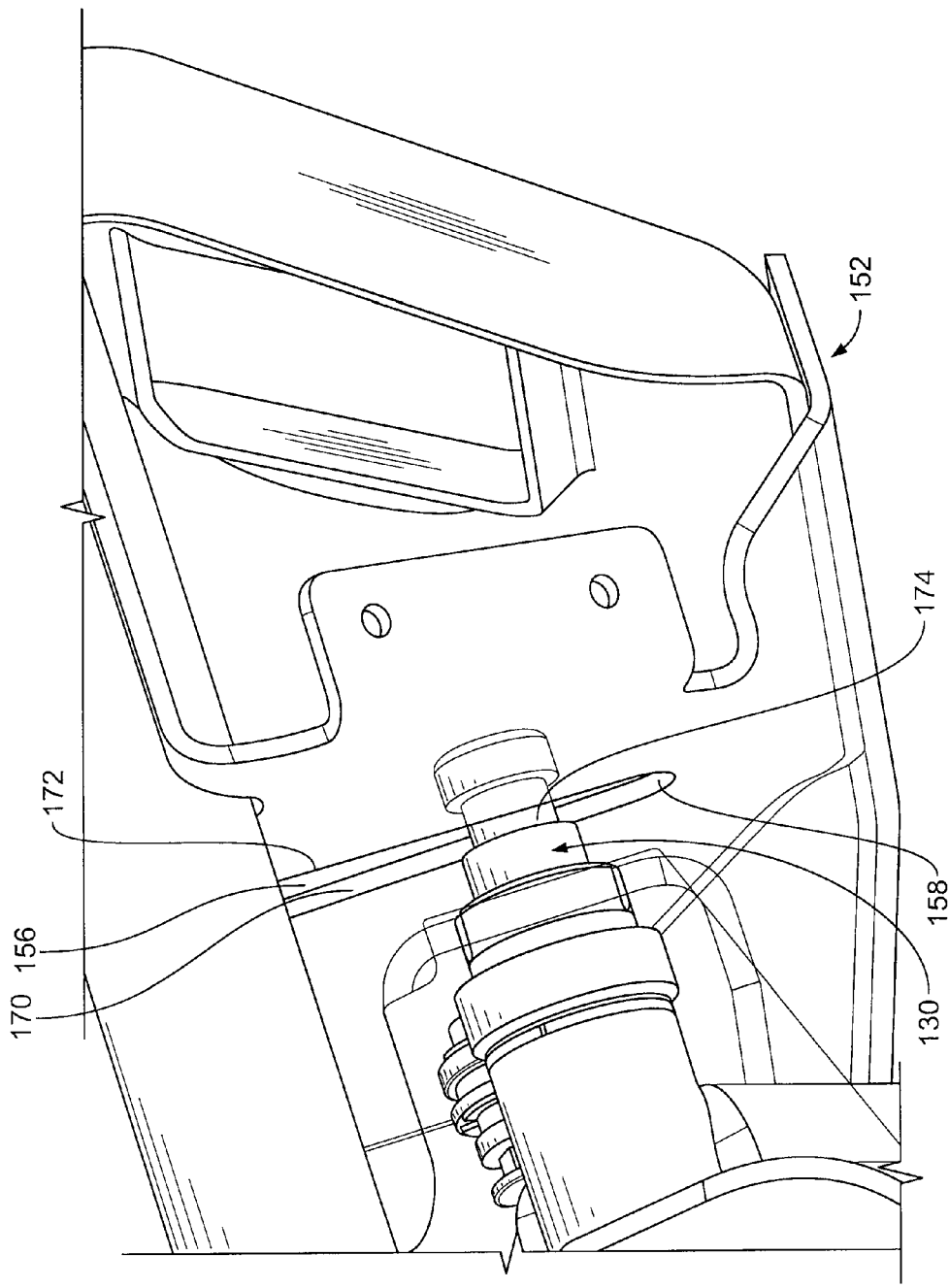
FIG. 7 is a partial cutaway view of the lower seat frame of FIG. 4.

Referring now to FIG. 7, illustrated is a rear cutaway view, i.e., a partially transparent view, of a portion of the seat 110. In this view, stop bracket 154 is made partially transparent to illustrate its interaction with other parts of the seat 110. Suspension rod 130 includes a proximal end 166 and a similar distal end 168 on the opposite side of the suspension rod 130. The proximal end 166 projects through the opening defined by slot 156, between the opposing side walls 170 and 172 of the stop bracket 154.

The suspension rod 130 is preferably of fairly uniform diameter along its length, except near the ends of the rod 130. The suspension rod 130 may be a single, unitary rod or may include two or more rod pieces, one or more associated with each stop bracket 154. The proximal end 166 of the rod 130 preferably includes an indented region 174 such that the rod 130 has a lesser diameter at the indented region 174 than along the remainder of the rod 130. The indented region 174 of the rod 130 is aligned with the opposing side walls 170 and 172 that define each slot 156 in the stop bracket 154. The dimensions of the indented region 174 and slot 156 are preferably selected such that the side walls 170 and 172 prevent axial movement of the rod 130, i.e., the side walls 170 and 172 retain the indented region 174 in each slot 156. Instead, when the tilt mechanism 143 is adjusted, or under crash circumstances, the indented region 174 moves longitudinally within each slot 156. The distal end 168 of the rod 130 preferably includes a similar indented region 174.

In ordinary operation, tilting of the seat 110, including the stop bracket 154 and also the lower frame 136 to which each stop bracket 154 is attached or of which it is a part, results in a definable range of permitted relative motion between the stop bracket 154 and the suspension rod 120. However, that freedom of motion is limited to maintain the integrity of the seat under a crash load. In the case where an event would cause excessive relative displacement between the suspension rod 130 and the stop bracket 154, the rod 130 engages the closed end 158 of each slot 156 to restrict further movement of each stop bracket 154.

Figure 8:
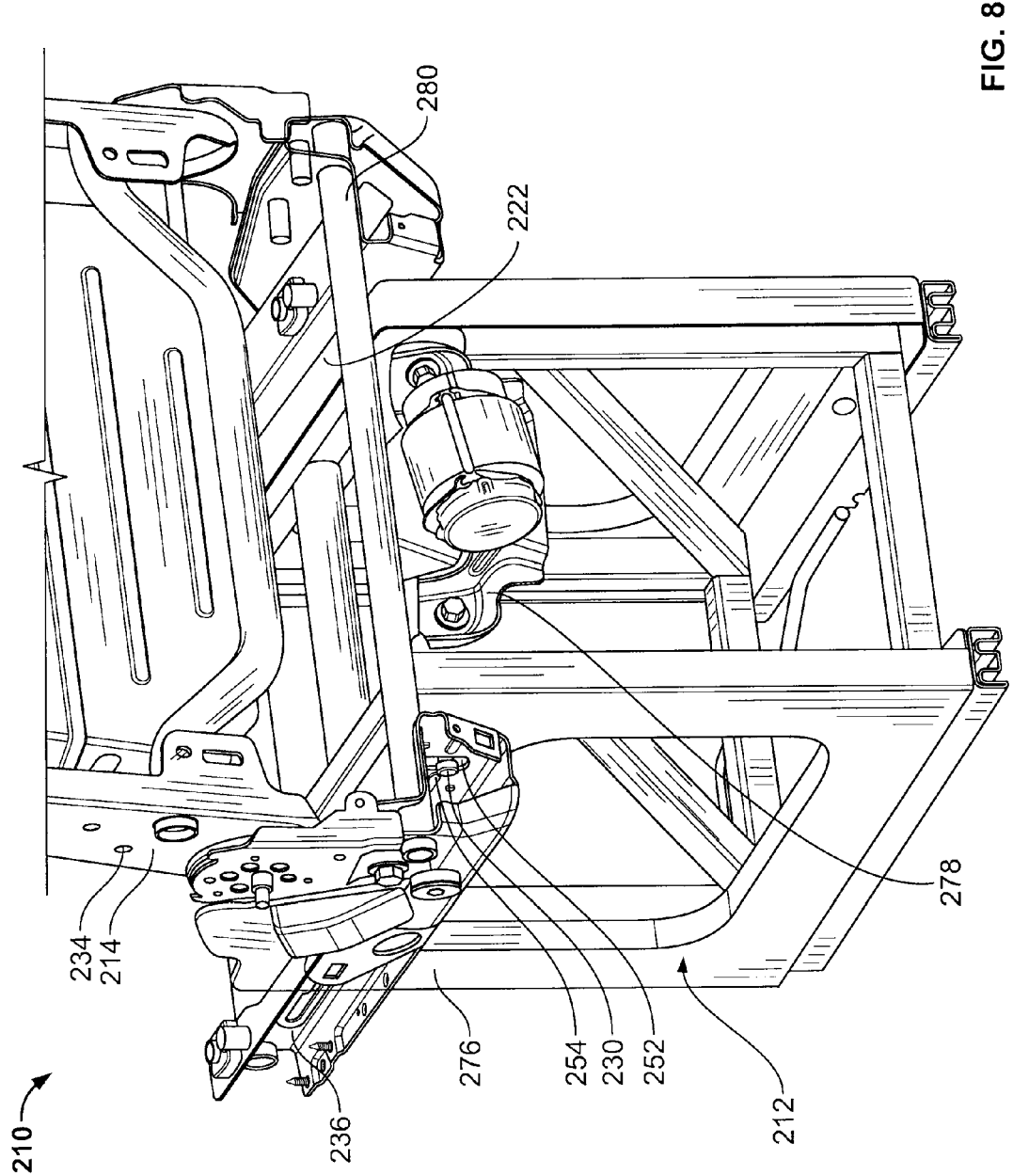
FIG. 8 is a partial perspective view of a second embodiment of a vehicle seat embodying features of the present invention.

FIG. 8 shows a second embodiment of a vehicle seat 210 incorporating a pivoting stop mechanism 252. The vehicle seat 210 is a static base vehicle seat, instead of a seat having a suspension base, as described above. It is an advantage of the present invention that the seat frame and pivoting stop mechanism can be used fairly interchangeably with a suspension base, a static base, or other seat bases. In other words, it is an advantage that the seat frame and pivoting stop mechanism need not be modified substantially for use in a static base vehicle seat, a suspension base vehicle seat, or other vehicle seats.

Static height seat 210 includes a seat base, or seat riser 212, of a fixed height. The seat riser 212 is preferably made of a group of structural support members 276, which essentially form a box-like structure. The structural support members 276 preferably include inter-engaging horizontal, vertical, and/or diagonal members, as shown in FIG. 8. The seat riser 212 preferably includes a top surface 222 made of a plurality of horizontal members, which functions in a manner similar to the platform 122 described above with respect to the suspension seat 110. Static height seat 210 further includes a seat frame 214, made of a lower frame 236 and an upper frame 234, with the lower frame 236 mounted to the seat riser 212. The seat frame 214 is substantially similar to that described above with respect to the suspension seat 110, as shown in FIG. 4.

Figure 9:
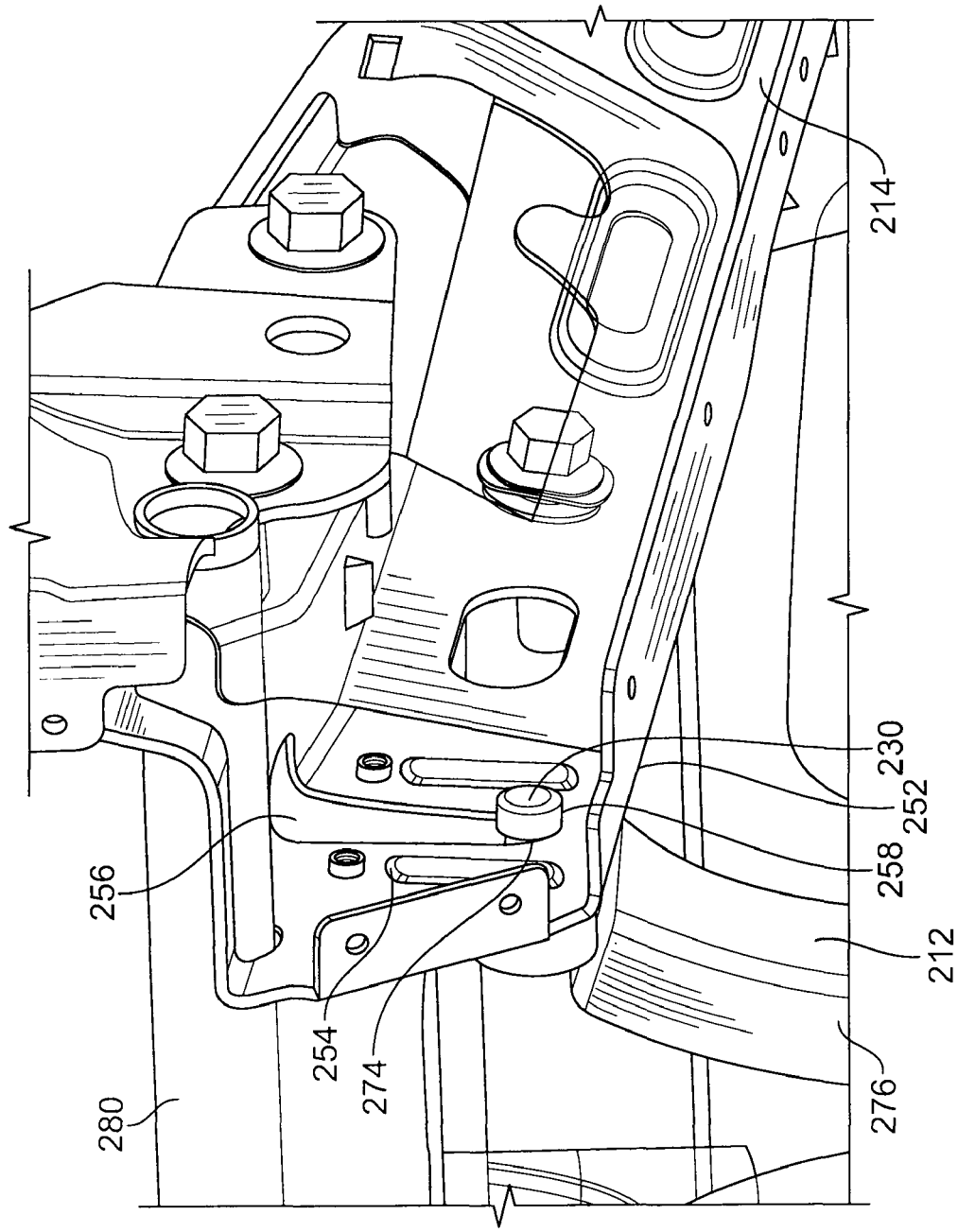
FIG. 9 is an enlarged partial cutaway view of the seat base assembly of the vehicle seat of FIG. 8.

FIG. 9 shows a cutaway portion of the rear of static height seat 210, including a pivoting stop mechanism 252, in a maximum forward tilt position. The lower seat frame 236 includes at least one stop bracket 254 with a slot 256 having a closed end 258 to accommodate suspension rod 230. The static seat 210 preferably includes two stop brackets 254, each with a slot 256 having a closed end 258, located opposite each other on either side of the lower frame 236. The rod 230 preferably includes an indented region 274 near each end, and the dimensions of the rod 230 and slots 256 are preferably selected such that the indented region 274 moves longitudinally (not axially) within each slot 256. The suspension rod 230 and stop brackets 254 preferably include the other features and characteristics described above with respect to the suspension base seat 110. As can be seen in FIG. 8, the rod 230 engages the closed end 258 of each slot 256 to define the maximum forward tilt position and to prevent further forward tilting movement of the seat frame 214.

Figure 10:
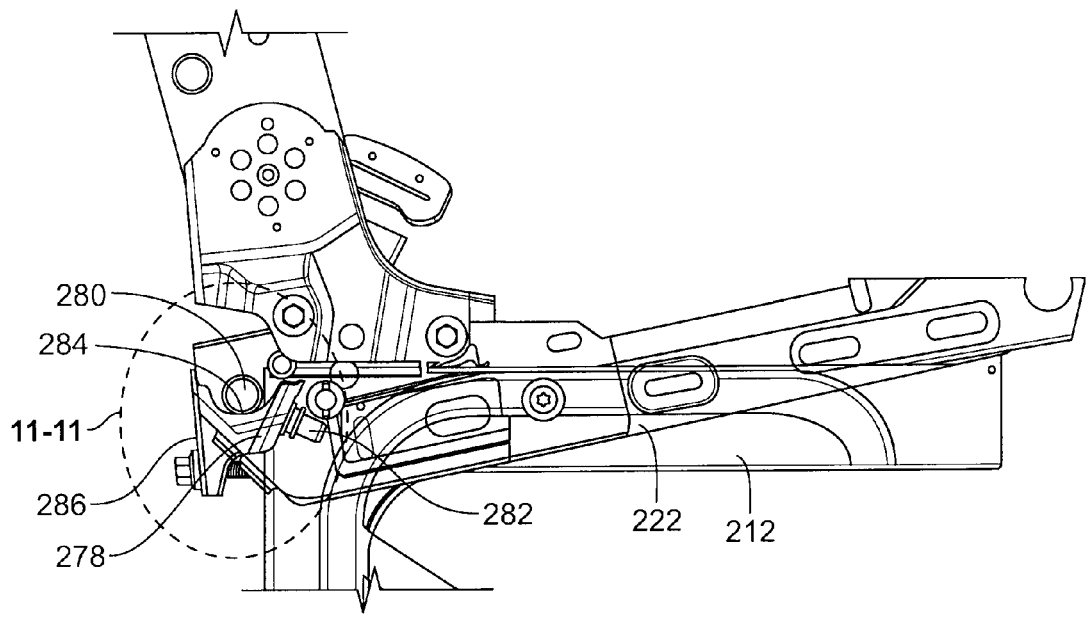
FIG. 10 is a partial side cutaway view of the seat base assembly of the vehicle seat of FIG. 8.
Figure 11:
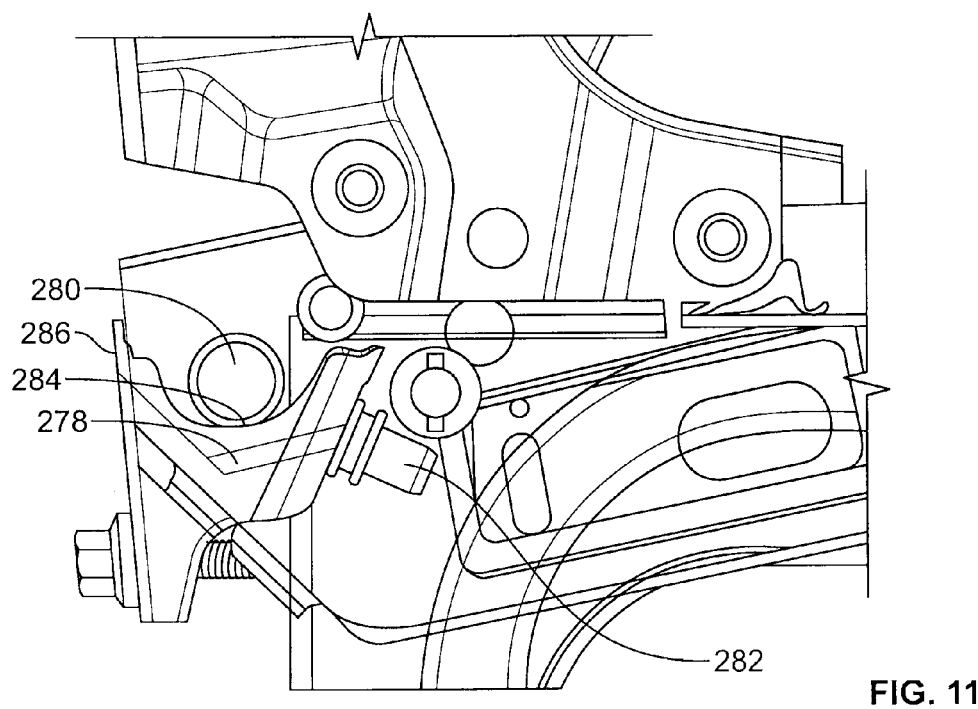
FIG. 11 is an enlarged cutaway view of area 11-11 of FIG. 10.

FIG. 10 is a side cutaway view of a portion of the static height seat 210, and FIG. 11 illustrates area 11-11 of FIG. 10 in greater detail. FIGS. 10 and 11 show an optional feature that prevents tilting of the seat frame 214 beyond a maximum rear tilt position. In FIGS. 10 and 11, the lower seat frame 236 is shown tilted to this maximum rear tilt position. As described further below, a portion of the seat frame 214 engages a stop member 278 projecting from the top surface 222 of the static base 212 to prevent further rearward tilting of the seat frame 214.

As shown in FIGS. 9, 10, and 11, the pivoting stop mechanism 252 includes a rear support rod 280 that traverses the width of the seat frame 214. The rear support rod 280 extends horizontally between and extends through each stop bracket 254 (or other support structure) located on either side of the seat 210. The rear support rod 280 is preferably supported by the stop brackets 254.

In addition, the seat riser 212 includes a stop member 278 that is rigidly secured to, and projects rearward from, the seat riser 212. As shown in FIG. 9, the stop member 278 is bolted to a rear horizontal member 282 of the seat riser 212, although it may be attached by any other conventional attachment methods. It may extend along a portion of or the entire width of the seat frame 214. The stop member 278 has two generally curved side walls 284 and a raised rear wall 286 for engagement with the rear support rod 280.

The stop member 278 limits the travel of the seat frame 214 by engaging the rear support rod 280 to prevent further movement of the rear support rod 280. Under crash conditions, where a rear crash load is applied against the seat frame 214, the seat frame 214 will rotate backwards and downwards about an axis of rotation. When the rear crash load is great enough, the tilt mechanism support structures are deformed and are not sufficiently strong to prevent rearward pivoting of the seat frame 214. Under these conditions, the rear support rod 280 will travel in an arc downwards and will engage the stop member 278, which is held rigidly by the seat riser 212, to define a maximum rearward tilt position. The stop member 280 may be affixed to the seat riser 212 in a manner to set the maximum rearward tilt position as desired. It may also be easily removed from the seat riser 212 to facilitate installation of the seat 210 or if the feature is not desired in a particular application.

Figure 12:
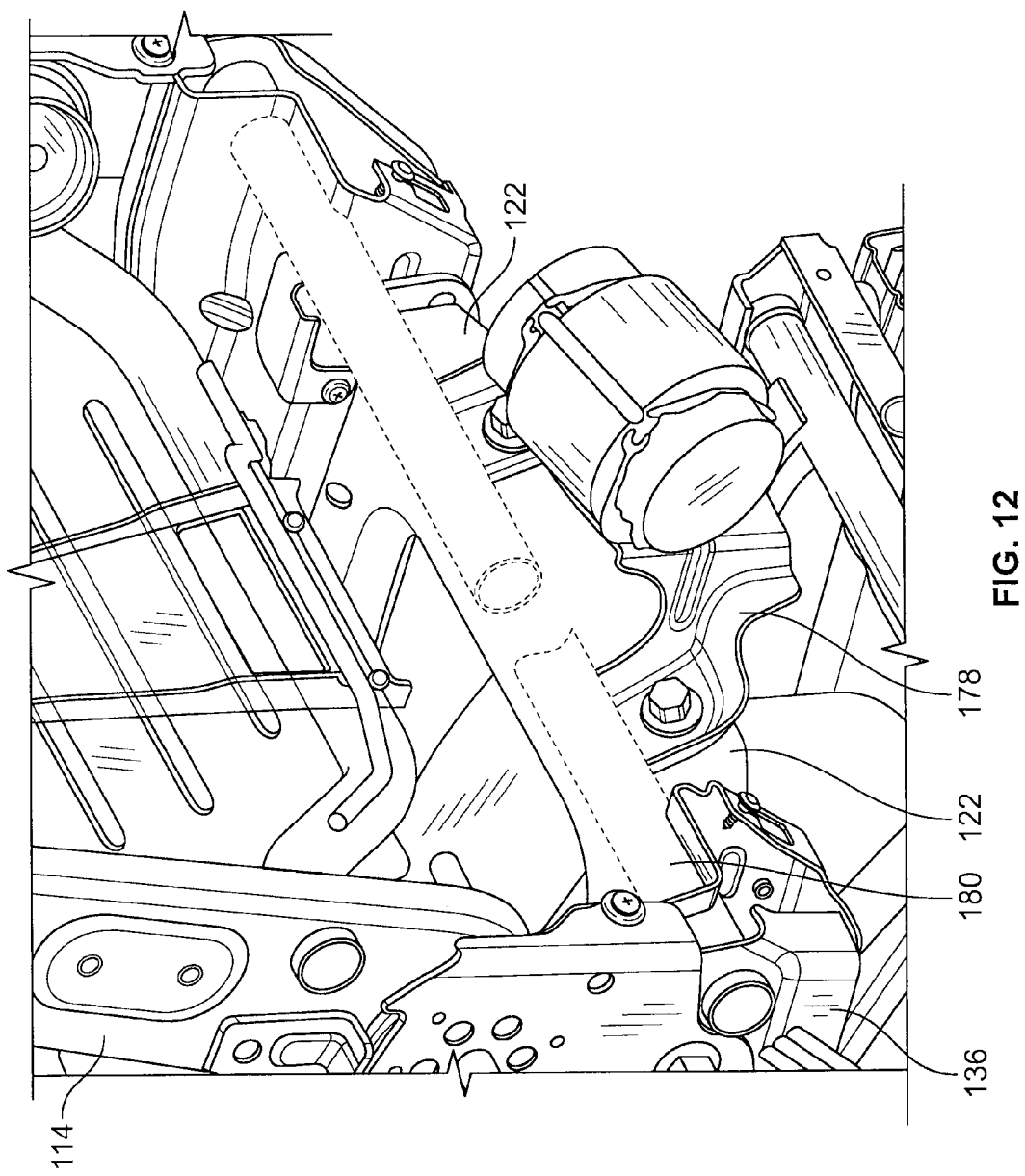
FIG. 12 is a partial perspective view of the vehicle seat of FIG. 4.

As shown in FIG. 12, the maximum rearward tilt feature can be incorporated in the suspension seat preferred embodiment and other embodiments as well. Rear support rod 180 is shown in the lower seat frame 136 of the suspension seat frame 114 (FIG. 4). The stop member 178 is preferably affixed to the platform 122 (or other mounting structure on the upper seat base portion 118), and projects rearward therefrom, to engage the rear support rod 180 and prevent further tilting of the seat frame 114 beyond a predetermined maximum angle of rotation.

There are alternative ways of setting a maximum rearward tilt position. It will be appreciated that the slot 256 of each stop bracket 254 can be modified so that it is closed at both ends, i.e., the slot may be oval, elliptical, racetrack-shaped, or some other shape with closed ends, to prevent both forward and rearward tilting beyond predetermined maximum positions. More specifically, a slot having a closed upper end would limit the rearward tilt travel of the seat frame 214. During crash conditions, each stop bracket would travel downwardly until its closed upper end engages the top of suspension rod 230. A slot having two closed ends could be used with both the suspension base or static base vehicle seats. In other words, a slot with two closed ends could be used with either the suspension and static base seats (or other seat embodiments) to limit range of travel and set both maximum forward and rearward tilt positions.

Figure 13:
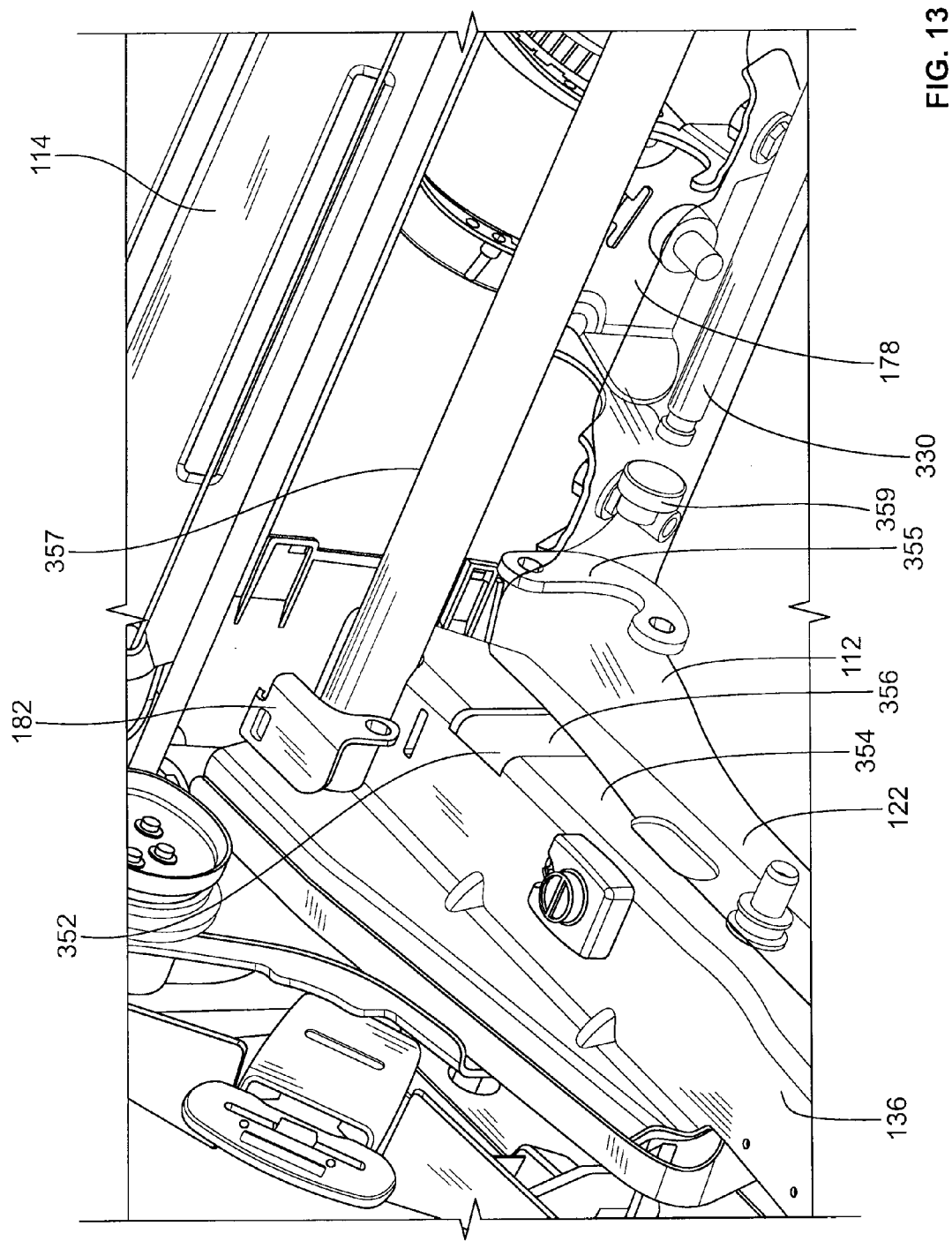
FIG. 13 is a partial perspective view of the vehicle seat of FIG. 4 showing an alternative embodiment of the pivoting stop mechanism prior to assembly of the pivoting stop mechanism.
Figure 14:
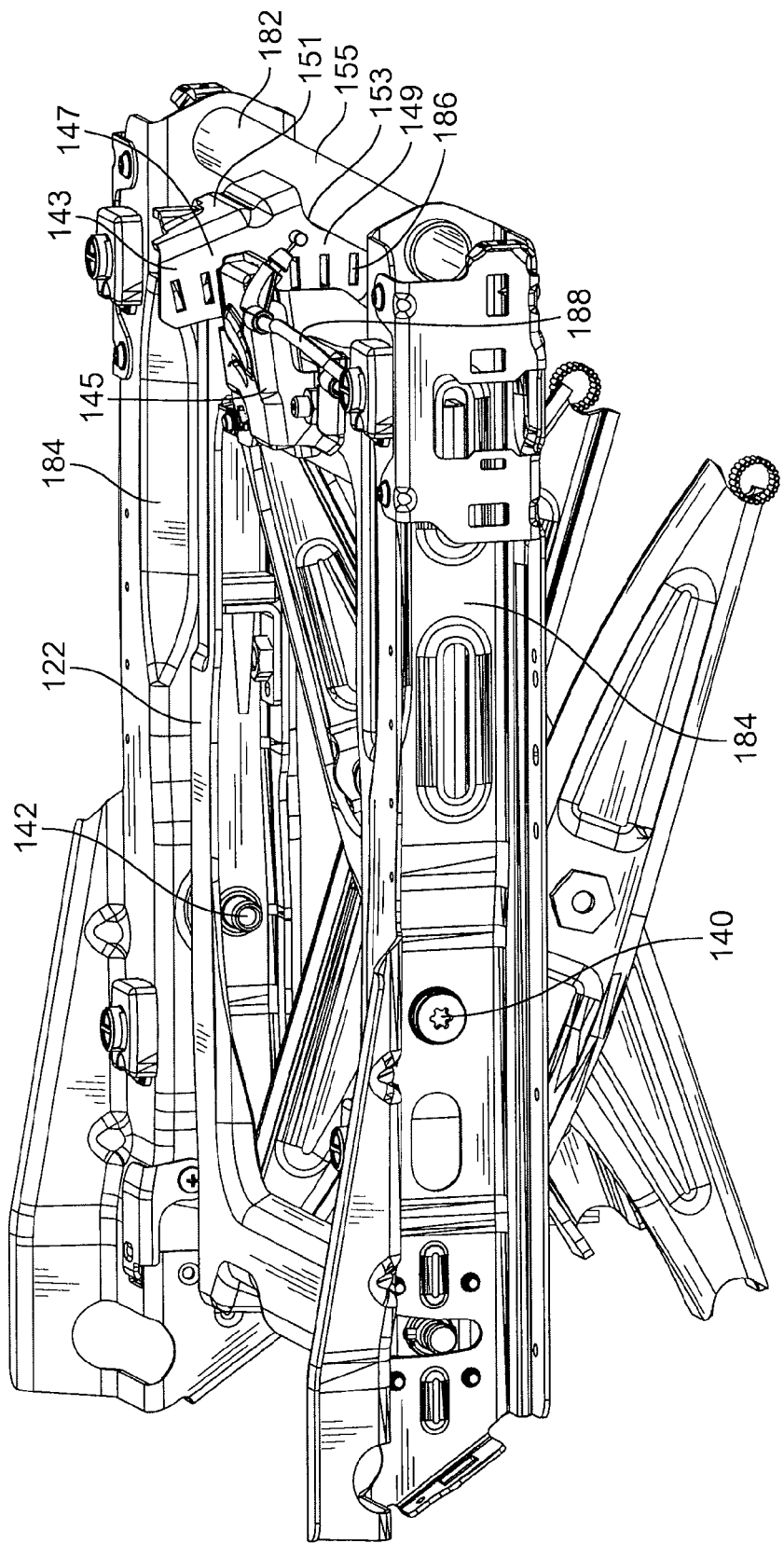
FIG. 14 is a partial perspective view of a tilt mechanism embodying features of the present invention with some of the structural elements of the vehicle seat of FIG. 4 illustrated.
Figure 15:
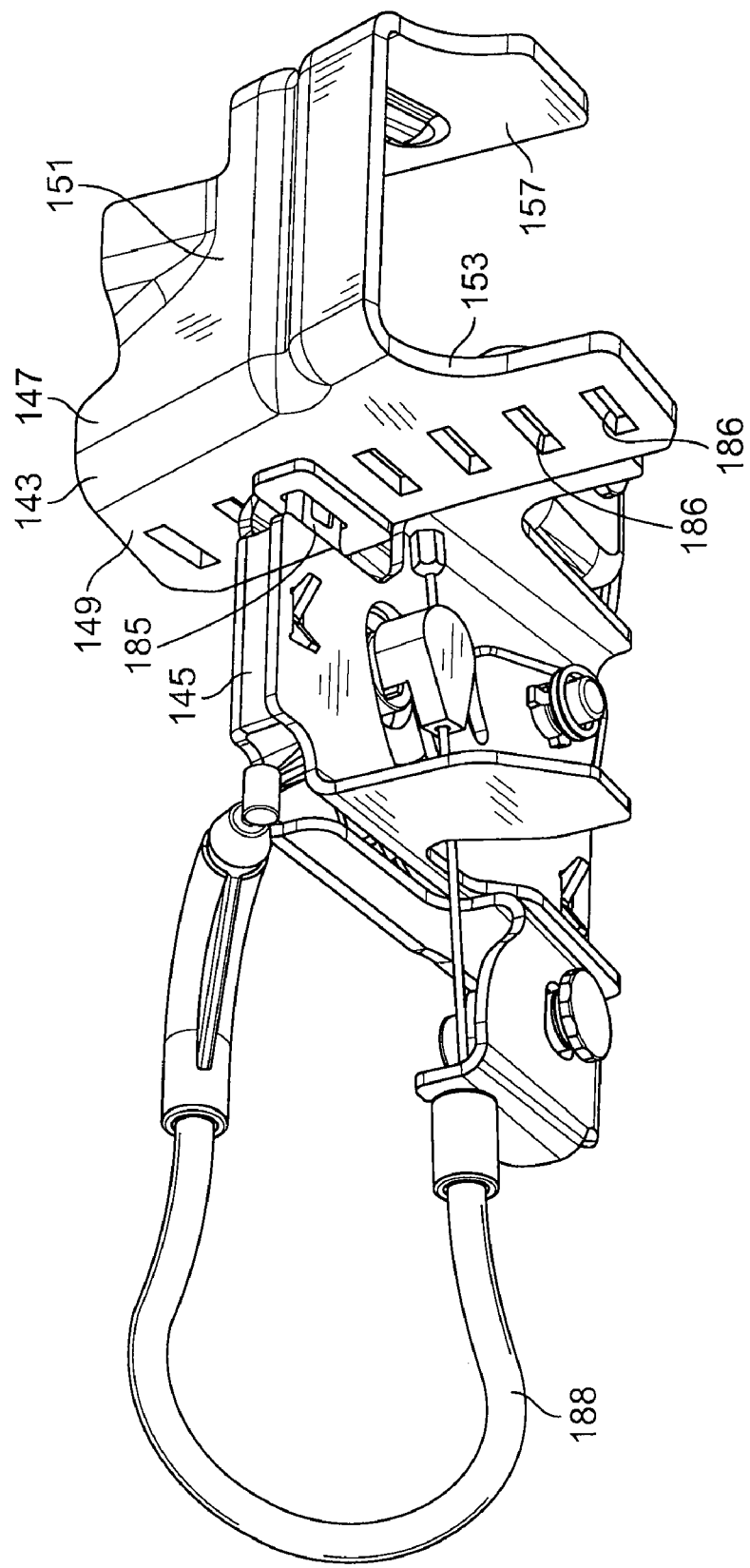
FIG. 15 is a bottom perspective view of the tilt adjustment member, tilt latch, and cable of the tilt mechanism of FIG. 14.
Figure 16:
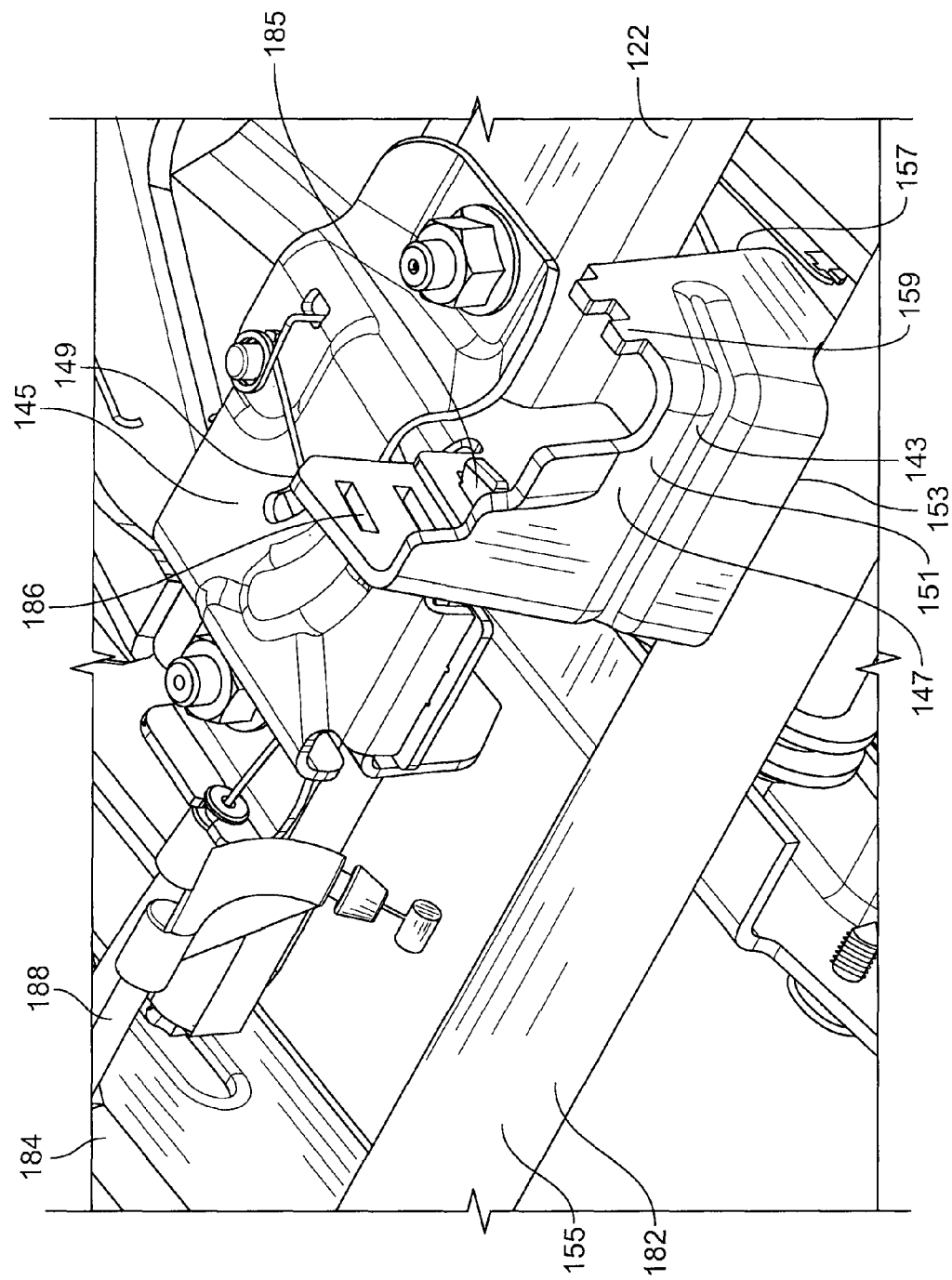
FIG. 16 is a partial perspective view of the tilt mechanism of FIG. 14 with some structural elements of the vehicle seat of FIG. 4 illustrated.
Figure 17:
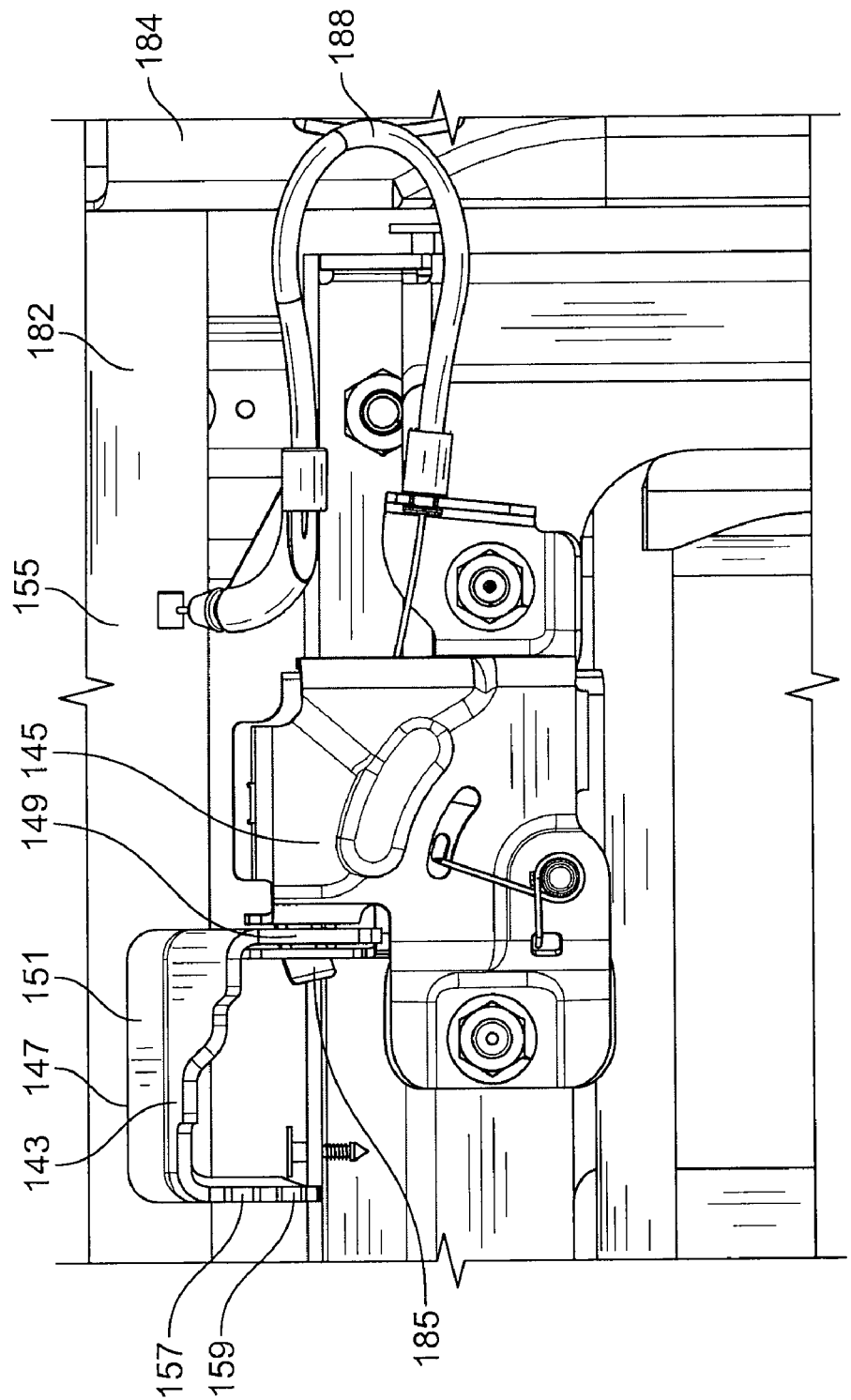
FIG. 17 is partial top view of the tilt mechanism of FIG. 14 with some structural elements of the vehicle seat of FIG. 4 illustrated.

It should be evident that the pivoting stop mechanism may be modified so that, instead of one integral bracket with a slot having one or both closed ends, it may include separate structural components that perform the same function. For example, FIG. 13 shows a slightly modified bracket 354 that sets both a maximum forward tilt position and a maximum rearward tilt position. As can be seen, the bracket 354 includes a slot 356 therethrough to allow pivoting movement of a suspension rod 330 therein, in a manner similar to that described above. The pivoting stop mechanism 352 (shown partially disassembled in FIG. 13), however, further includes a separate down-stop member 355 that limits forward pivoting movement of the seat frame 314. The down-stop member 355 preferably includes a curved portion between bolted ends for engaging the suspension rod 330 at the maximum forward tilt position. This down-stop portion 355 is bolted to the bracket 354 or attached thereto by any other conventional fastening methods.

As can be seen from FIG. 13, the pivoting stop mechanism 352 also limits rearward tilting past a predetermined position. More specifically, pivoting stop mechanism 352 includes a separate up-stop member 357 for limiting rearward pivoting movement. The up-stop member 355 preferably includes a curved portion between bolted ends for engaging the suspension rod 330 at the maximum rearward tilt position. This upstop portion 357 is bolted to the bracket 354 or attached thereto by any other conventional fastening methods. Further, as can be seen in FIG. 13, an annular member 359 having a greater diameter than the rod 330 may be placed on the rod 330 near the ends to keep the ends properly positioned in the slot 356. It should be evident that such annular members may be used as an alternative to a rod having regions with a smaller diameter near its ends corresponding to the respective bracket slots.

Another form of the invention is a method for limiting forward pivoting movement of a vehicle seat assembly, in accordance with the above description. More specifically, the method generally includes providing a vehicle seat assembly comprising a seat frame and a seat base of a certain width; mounting the seat base to the floor of the vehicle where the seat base having a first stop member at a first rearward position; mounting the seat frame to the seat base where the seat frame has one or more second stop members at one or more second rearward positions; and coupling the seat frame to the seat base such that the first and second stop members at the rearward positions allow a predetermined amount of angular rotation of the seat frame when the first and second stop members are not engaged and limit forward pivoting movement of the seat frame beyond a predetermined position when the first and second stop members are engaged. In this method, the first stop member may be a suspension rod having first and second ends and extending substantially the width of the seat base, and the one or more second stop members may be two brackets with each bracket having a slot therein for receiving a respective end of the rod and with each slot having one or more closed ends.

The preferred embodiments of the pivoting stop mechanisms described above are intended to cooperate with a tilt mechanism 143 to allow tilting of the seat frame through a predetermined range of angular motion without interference from the pivoting stop mechanism. The pivoting stop mechanisms, however, limit tilting beyond a maximum forward tilt position and may also limit tilting beyond a maximum rear tilt position. FIGS. 14-17 show tilt mechanism 143 in greater detail, which is shown in connection with the first embodiment of the vehicle seat described above but which may be used with the static seat embodiment or with other seat embodiments. The tilt mechanism 143 allows movement of the seat frame 114 relative to the seat base 112 through pivoting about pivot pins 140 and 142.

As can be seen, the tilt mechanism 143 generally includes a tilt adjustment member 145 and a tilt latch 147. The tilt adjustment member 145 is preferably bolted to the seat base 112, or attached thereto by any other conventional fastening means. More specifically, the tilt adjustment member 145 is preferably attached to the top surface of the platform 122. The tilt latch 147 engages the lower seat frame 136. More specifically, it preferably engages a forward suspension rod 182 that extends between the substantially parallel arms 184 of the lower seat frame 136.

The tilt adjustment member 145 includes a laterally protruding flange 185 that interlockably engages one of a plurality of slots 186 in the tilt latch 147. The slots 186 are arranged vertically in a raised side wall 149 of the tilt latch 147. The seat frame 114 may be adjusted to various tilt positions relative to the seat base 112 by vertical movement of the flange 185 and insertion of the flange 185 into the desired corresponding slot 186.

The tilt mechanism 143 is preferably cable operated for selection of the desired tilt position. The cable 188 links a conventional user interface to the tilt adjustment member 145 and tilt latch 147. Adjustment of the tension in the cable 188 through the user interface provides for relative horizontal movement between the tilt adjustment member 145 and tilt latch 147 to allow the flange 185 to be removed from one slot 186 and to be inserted in a different one.

As shown in FIGS. 14-17, and described above, the tilt latch 147 includes a first vertically-extended side wall 149 having vertically-arranged slots 186 therein to set the desired tilt position. The tilt latch 147 also includes a front wall 151 having a curved lower portion 153 for engagement with the corresponding curved exterior portion 155 of forward suspension rod 182. The tilt latch 147 includes a second side wall 157 with two upwardly protruding flanges 159 that preferably defines a portion of a cushion slide mechanism 161, described further below, thereby reducing the number of parts of the seat and reducing the complexity of the seat.

In a preferred form, the tilt mechanism 143 allows the seat frame 114 to tilt backwards up to about 10° from vertical and provides a forward tilt up to about 5° from vertical, although this range of angular movement may be modified, as desired. The tilt mechanism 143 is mounted in the front center of the seat and close to a user interface at the front center of the seat. The design does not require alignment of parts on either side of the seat, as is required in conventional designs. The cable operation at the front center of the seat also makes the tilt mechanism 143 easier to service than side-mounted and side-operated tilt mechanisms. It avoids the use of conventional gear mechanisms and gas springs that may be more complex, more costly, less reliable, and more difficult to repair.

Figure 18:
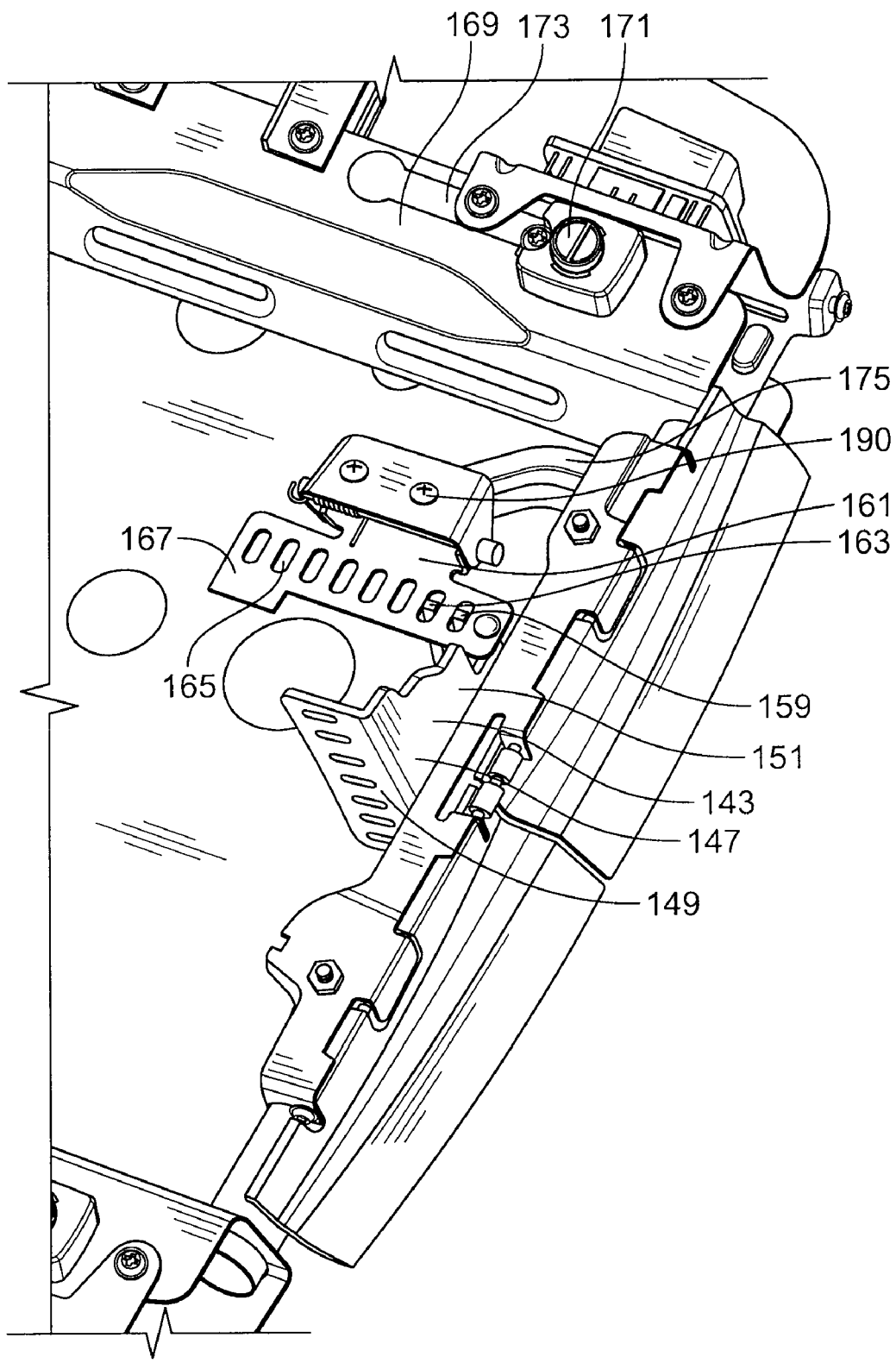
FIG. 18 is a partial cutaway view of an embodiment of a cushion slide mechanism embodying features of the present invention with some structural elements of the vehicle seat of FIG. 4 illustrated.
Figure 19:
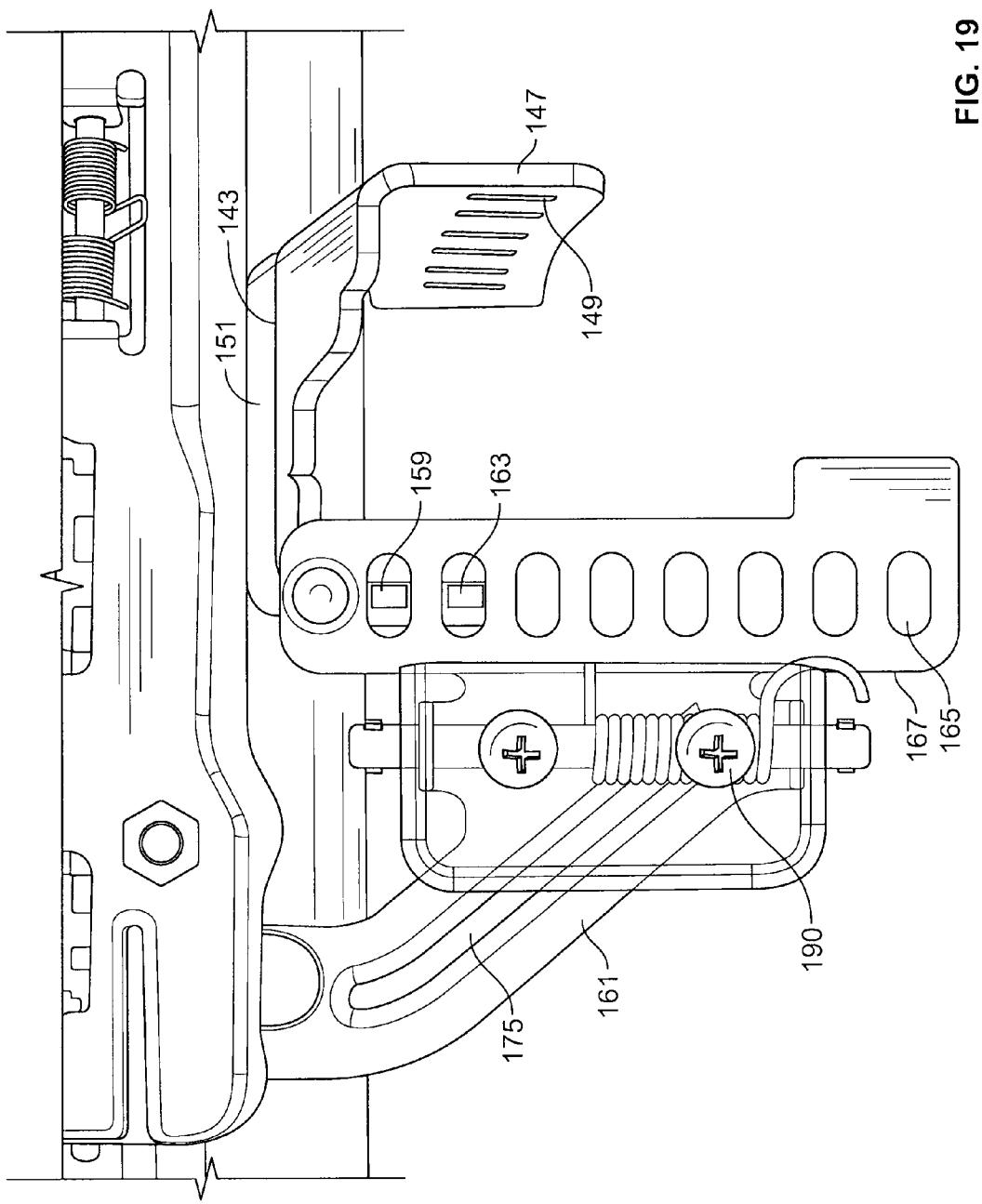
FIG. 19 is a partial top cutaway view of the cushion slide mechanism of FIG. 18 with some structural elements of the vehicle seat of FIG. 4 illustrated.
Figure 20:
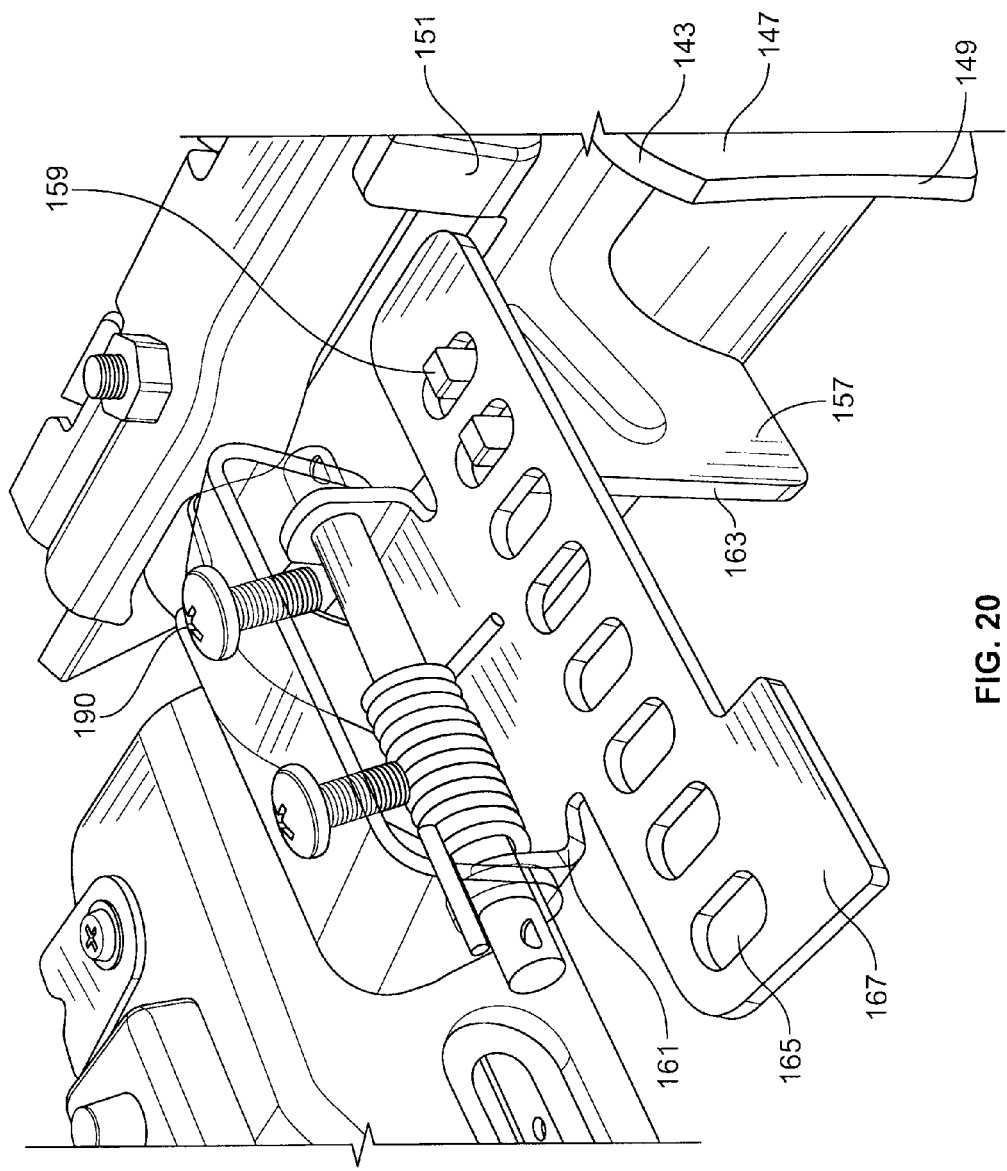
FIG. 20 is a partial cutaway view of the cushion slide mechanism of FIG. 18 with some structural elements of the vehicle seat of FIG. 4 illustrated.

One advantage of the tilt mechanism 143 described herein is that part of its structure may be incorporated into a cushion slide mechanism 161. More specifically, the second side wall 157 of the tilt mechanism 143 includes one or more upwardly protruding flanges 159, preferably two, that act as a cushion slide lock 163. As can be seen in FIGS. 18-20, and as described further below, the protruding flanges 159 interlockably engage two adjacent slots 165 of a cushion latch 167 to adjust the position of a cushion pan 169 and cushion, as desired by the occupant. In FIG. 18, the cushion pan 169 is made partially transparent to illustrate its interaction with the cushion slide mechanism 161.

The cushion slide mechanism 161 generally includes a cushion lock 163, a cushion latch 167, and several cushion slide blocks 171. The cushion lock 163 is preferably part of the tilt mechanism 143 and is attached to the lower seat frame 136. In contrast, the cushion latch 167 is bolted, or fastened by other conventional means, to a cushion pan 169, which is positioned vertically above the lower seat frame 136. In FIG. 18, the cushion pan 169 is shown bolted to the cushion latch 167 with two bolts 190. The cushion pan 169 is slid ably moveable in a fore-aft direction through the operation of a number of cushion slide blocks 171, preferably four blocks. The cushion slide blocks 171 are mounted to the lower seat frame 136 and include upper portions that are moveable in the fore-aft direction through slots 173 in the cushion pan 169. The top portion of each block 171 has a larger diameter than the intermediate portion to keep each block 171 in its position within the corresponding slot 173. The blocks 171 permit sliding movement of the cushion pan 169 relative to the lower seat frame 136.

The cushion latch 167 is used by the occupant to move the cushion pan 169 to the desired fore-aft position relative to the lower seat frame 136. The cushion latch 167 is connected by an operator arm 175 to a user interface in the form of cushion handle 177. The cushion handle 177 is actuated by the occupant to raise the latch 167 upwards to disengage the latch 167 from the protruding flanges 159 of the tilt mechanism 143, and the occupant can then move the cushion pan 169 in a fore-aft direction to the new desired fore-aft position. The occupant then releases the cushion handle 177 to lower the slots 173 and allow two slots to interlockably engage the two upwardly protruding flanges 159 corresponding to the newly-selected fore-aft position. The cushion latch 167 preferably includes a number of horizontally-arranged slots 173 for engagement with the cushion lock 163 to define various fore-aft positions. In one preferred form, the cushion slide mechanism 161 allows the cushion pan 169 to slide fore and aft in a predetermined range of about 60 millimeters, although this range is easily adjustable.

Although the present disclosure has been described in relation to particular embodiments thereof, many other variations and modifications and other uses will become apparent to those skilled in the art. It is preferred, therefore, that the present disclosure be limited not by the specific embodiments herein, but only by the appended claims.

What is claimed is:

1. A vehicle seat belt restraining system comprising:
a seat including a seat frame and a seat base;
a seat belt restraint assembly integrally mounted to the seat frame; and
a pivot stop mechanism having a first stop and a second stop, the second stop being disposed in front of the first stop and comprising a bar extending between parallel arms of the seat frame,
wherein an underside of the bar is configured to engage a top portion of the seat base that mounts the seat frame to a vehicle and limits forward pivoting movement of the seat frame with respect to the seat base.

2. The vehicle seat system of claim 1 wherein the top portion of the seat base comprises a platform, and wherein the underside of the bar is configured to engage the platform and limits forward pivoting movement of the seat frame with respect to the seat base.

3. The vehicle seat belt restraining system of claim 1 wherein the first stop couples the seat frame to the seat base, the first stop including a bracket mounted on each side of the seat frame, the brackets including a slot to receive a first rod moveable within each slot, each slot having a closed end to limit movement of the first rod thereby limiting forward pivoting movement of the seat frame with respect to the seat base.

4. The vehicle seat belt restraining system of claim 1 wherein the seat base is one of a suspension base to allow adjustment of the height of the seat frame or a static base that does not provide for adjustment of the height of the seat frame.

5. The vehicle seat belt restraining system of claim 1 wherein the seat belt restraining assembly further includes a D-ring member mounted to an upper seat frame and a buckle attached to the seat frame, wherein the restraining belt passes through the D-ring member and fastens to the buckle.

6. The vehicle seat belt restraining system of claim 1 further comprising a third stop mounted to a rear of the seat base.

7. The vehicle seat belt restraining system of claim 6 wherein the third stop includes a rear stop member and a second rod mounted to the seat frame and extending between two brackets.

8. The vehicle seat belt restraining system of claim 7 wherein the rear stop member includes curved side walls and a rear wall to limit rearward pivoting movement when the second rod engages the rear stop member.

9. A vehicle seat system comprising:
a seat including a seat frame and a seat base;
a seat belt restraint assembly configured for mounting on the seat frame, the seat belt restraint assembly including:
a D-ring member mounted to an upper seat frame;
a buckle attached to a lower seat frame; and
a restraining belt integrally mounted to the seat frame, the restraining belt passing through the D-ring member and fastening to the buckle;
stop brackets that couple the seat base to the seat frame that pivots with respect to the seat base; and
a first rear stop including a rear stop member and a rear support rod, the rear stop member being attached to a rear of the seat base and having curved side walls and a rear wall, the rear support rod extending between and being mounted to the stop brackets,
wherein the rear support rod engages the rear stop member to limit rearward pivoting movement of the seat frame with respect to the seat base.

10. The vehicle seat system of claim 9 further comprising a linking system for interconnecting the seat base to the seat frame, wherein the linking system provides a suspension type system and comprises one or more cooperating scissor arm assemblies for adjustment of a height of the seat frame.

11. The vehicle seat system of claim 9 wherein the seat base is a static base that does not provide for adjustment of the height of the seat frame.

12. The vehicle seat system of claim 9 wherein the seat base comprises a plurality of members defining a bottom portion and extending generally away from the bottom portion to define a top portion, the first rear stop operating at the top portion to limit forward pivoting movement of the seat frame.

13. The vehicle seat system of claim 9 further comprising a forward stop disposed in front of the first rear stop and comprising a forward bar extending between parallel arms of the lower seat frame, wherein an underside of the forward bar is configured to engage a top of the seat base that mounts the seat frame to the vehicle and limits forward pivoting movement of the seat frame with respect to the seat base.

14. The vehicle seat system of claim 13 wherein a top portion of the seat base comprises a platform mounted between the stop brackets, and wherein the underside of the forward bar is configured to engage the platform and limits forward pivoting movement of the seat frame with respect to the seat base.

15. The vehicle seat system of claim 9 further comprising a second rear stop having a moveable rod mounted in a slot in each stop bracket, each slot having a closed end to limit movement of the moveable rod thereby limiting forward pivoting movement of the seat frame with respect to the seat base.

16. The vehicle seat system of claim 15 wherein the moveable rod has a circular cross-section and includes a first diameter and a second diameter that is less than the first diameter, the second diameter corresponding to a region located at each end of the moveable rod, the two regions of the moveable rod adapted for relative movement within the slot of each stop bracket and adapted for engagement with a respective first closed end of each stop bracket.

17. The vehicle seat system of claim 16 wherein each slot comprises a second closed end, the first and second closed ends configured for allowing pivotal movement of the seat frame through a predetermined range of angular motion, limiting forward pivoting movement of the seat frame beyond a predetermined forward position, and limiting rearward pivoting movement beyond a predetermined rearward position.

18. The vehicle seat system of claim 17 wherein each stop bracket comprises an inner surface facing the moveable rod and a depression jog in the inner surface for mounting the moveable rod in the slot of each bracket.

19. The vehicle seat system of claim 9 further comprising a tilt adjustment mechanism comprising a tilt adjustment member mounted to the seat base and a tilt latch mounted to the seat frame, the tilt adjustment member selectively engaging the tilt latch to set the seat frame to one of a predetermined number of tilt positions that are not beyond a predetermined maximum forward pivoting position.

20. The vehicle seat system of claim 19 wherein the seat base comprises a plurality of members defining a bottom portion and extending generally away from the bottom portion to define a top portion and wherein the seat frame comprises a forward suspension rod, the tilt adjustment member mounted to the top portion of the seat base and the tilt latch mounted to the forward suspension rod.

21. The vehicle seat system of claim 20 wherein the tilt adjustment member includes a protruding flange and wherein the tilt latch has a plurality of vertically arranged slots, the protruding flange selectively and interlockably engaging one of the plurality of slots to set the seat frame to a predetermined tilt position relative to the seat base.

22. The vehicle seat system of claim 21 further comprising a cushion pan and a cushion slide mechanism for fore-aft movement of the cushion pan through a predetermined range of movement, the tilt latch including a wall portion that defines a portion of the cushion slide mechanism.

23. The vehicle seat system of claim 22 wherein the cushion slide mechanism comprises a cushion lock mounted to the seat frame and a cushion latch mounted to the cushion pan, the cushion lock selectively engaging the cushion latch to set the seat frame to one of a predetermined number of fore-aft positions.

24. The vehicle seat system of claim 23 wherein the cushion lock is defined by the wall portion and includes one or more protruding flanges and wherein the cushion latch includes a plurality of horizontally arranged slots, the one or more protruding flanges selectively and interlockably engaging one of the plurality of slots to set the cushion pan to the predetermined fore-aft position.

25. The vehicle seat system of claim 24 further comprising a plurality of cushion slide blocks mounted to the seat frame, each block including an upper portion extending through a slot in the cushion pan for sliding movement of the cushion pan relative to the seat frame between maximum fore and aft positions.

26. A method for limiting forward and/or rearward pivoting movement of a vehicle seat assembly comprising:
mounting a seat base to a floor of a vehicle;
mounting a seat frame to the seat base, the seat frame being pivotally moveable with respect to the seat base;
providing a first rear stop, the first rear stop including a bracket mounted on each side of a lower seat frame, each bracket including a slot to receive a moveable rod, each slot having a closed end that limits movement of the moveable rod;
engaging the moveable rod with the closed end of each slot;
limiting forward pivoting movement of the seat frame with respect to the seat base;
providing a second rear stop, the second rear stop including a rear stop member and a rear support rod, the rear stop member being attached to a rear of the seat base and having curved side walls and a rear wall, the rear support rod extending between and being mounted to the brackets;
engaging the rear support rod with the rear stop member; and
limiting rearward pivoting movement of the seat frame with respect to the seat base.

27. The method of claim 26 further comprising:
providing a forward stop disposed in front of the first and second rear stop, the forward stop comprising a forward bar extending between parallel arms of a lower seat frame of the seat frame;
engaging an underside of the forward bar with a top of the seat base; and
limiting forward pivoting movement of the seat frame with respect to the seat base.

28. The method of claim 26 further comprising providing a seat belt restraint assembly configured for mounting on the seat frame, the seat belt restraint assembly including a restraining belt integrally mounted to the seat frame.

29. The method of claim 26, wherein the seat base is a suspension base to allow adjustment of the height of the seat frame or a static base that does not provide for adjustment of the height of the seat frame.

* * * * *